US006367918B1

(12) United States Patent
Heiles et al.

(10) Patent No.: US 6,367,918 B1
(45) Date of Patent: Apr. 9, 2002

(54) UNITARY LATCHING DEVICE FOR SECURE POSITIONING OF PRINT CARTRIDGE DURING PRINTING, PRIMING AND REPLENISHMENT

(75) Inventors: Tod S Heiles; Kenneth R Williams, both of Vancouver; Thomas Cocklin, Ridgefield, all of WA (US); B Michael Eckard, Cardiff, CA (US); Christopher Taylor; Richard H Lewis, both of Barcelona (ES); Antoni Murcia, San Diego, CA (US); Norman E Pawlowski, Corvallis, OR (US); Ted Lee, San Diego, CA (US)

(73) Assignee: Hewlett-Packard Company, Pala Alto, CA (US)

( * ) Notice: Subject to any disclaimer, the term of this patent is extended or adjusted under 35 U.S.C. 154(b) by 0 days.

(21) Appl. No.: 09/431,711

(22) Filed: Oct. 31, 1999

Related U.S. Application Data

(63) Continuation-in-part of application No. 08/706,045, filed on Aug. 30, 1996, now Pat. No. 5,980,032, which is a continuation-in-part of application No. 08/550,902, filed on Oct. 31, 1995, now Pat. No. 5,872,584, which is a continuation-in-part of application No. 08/518,847, filed on Aug. 24, 1995, now Pat. No. 5,736,992, which is a continuation-in-part of application No. 08/331,453, filed on Oct. 31, 1994, now Pat. No. 5,583,545.

(51) Int. Cl.$^7$ ............................................. B41J 2/175
(52) U.S. Cl. ................................................... 347/86
(58) Field of Search .............................. 347/50, 84, 85, 347/86, 87, 37, 39, 49

(56) References Cited

U.S. PATENT DOCUMENTS

| 5,583,545 | A | | 12/1996 | Pawlowski et al. | |
| 5,736,992 | A | | 4/1998 | Pawlowski | |
| 5,872,584 | A | | 2/1999 | Hauck | |
| 5,980,032 | A | | 11/1999 | Lee | |
| 6,164,771 | A | * | 12/2000 | Eckard et al. | ................. 347/86 |
| 6,170,940 | B1 | * | 1/2001 | Shinada et al. | ................. 347/86 |

* cited by examiner

Primary Examiner—Huan Tran

(57) ABSTRACT

A unitary latching device moves between an open position allowing individual inkjet print cartridges to be installed or replaced and a closed position securely positioning a plurality of print cartridges in a carriage during printing, replenishing and servicing modes.

20 Claims, 25 Drawing Sheets

UNITARY LATCHING DEVICE FOR SECURE POSITIONING OF PRINT CARTRIDGE DURING PRINTING, PRIMING AND REPLENISHMENT

RELATED APPLICATIONS

This is a continuation-in-part of commonly assigned application Ser. No. 08/706,045 filed Aug. 30, 1996 entitled "Compliant Ink Interconnect Between Print Cartridge And Carriage" by Norman Pawlowski, Jr. et al., now U.S. Pat. No. 5,980,032, which is a continuation-in-part of U.S. patent application Ser. No. 08/550,902 filed Oct. 31, 1995, entitled "Apparatus For Providing Ink To An Ink-Jet Print Head And For Compensating For Entrapped Air" by Norman Pawlowski, Jr. et al., now U.S. Pat. No. 5,872,584, which is a continuation-in-part of U.S. patent application Ser. No. 08/518,847 filed Aug. 24, 1995, entitled "Pressure Regulated Free-Ink Ink-Jet Pen," by Norman Pawlowski, Jr. et al., now U.S. Pat. No. 5,736,992, which is a continuation-in-part of U.S. patent application Ser. No. 08/331,453 filed Oct. 31, 1994 entitled "Ink Level Detection In A Pressure Regulated Pen", by Norman Pawlowski et al., now U.S. Pat. No. 5,583,545, all of which are incorporated herein by reference.

This application relates to the subject matter disclosed in commonly assigned co-pending U.S. patent application Ser. No. 09/431,709, filed Oct. 31, 1999 entitled "Pivoted Printhead Handle With Recessed Rest Position" by B. Michael Eckard et al.; U.S. patent application Ser. No. 09/451,712 filed Oct. 31, 1999 entitled "Datum Structure For Compact Print Cartridge" by Kenneth R. Williams et al.; U.S. patent application Ser. No. 09/431,710, now U.S. Pat. No. 6,164,177 filed Oct. 31, 1999 entitled "Compact Print Cartridge With Oppositely Located Fluid And Electrical Interconnects" by B. Michael Eckard et al.; U.S. patent application Ser. No. 08/878,489 filed Jun. 18, 1997 entitled "Inkjet Pen Alignment Mechanism And Method" by Kenneth R. Williams et al.; and European Patent Application Serial No. 99103110.5 filed Feb. 17, 1999 entitled "Positive Pressure Priming System For Maintenance And Recovery Of Printheads With Regulated Ink Delivery Systems Vented To The Atmosphere" by Christopher Taylor et al., all of which are incorporated herein by reference.

BACKGROUND OF THE INVENTION

Various problems present themselves in design of current inkjet printers. Modern inkjet printers print at very high resolution, for example, 600 or even 1200 dots-per-inch (DPI). As resolution increases, droplet size typically decreases. With increased resolution and decreased dot size, it becomes more important that the pens be precisely located in the carriage. To accomplish accurate positioning of the pen in the carriage, the pen typically has a set of physical X, Y, and Z datums that are seated against a corresponding set of datums in the carriage stall.

Modern inkjet printers typically print in color and have a plurality of color pens, usually printing in cyan, magenta, yellow, and black. It is often desirable to provide a different pen for each color, so that if a single pen goes bad, only that pen need be replaced. However, each pen must be precisely aligned with the other colors, or the print quality of the printed images will be degraded. Therefore, the system must not only accommodate precision placement of the pens in the stalls, but precise alignment among the colors.

In addition to the mechanical positioning of the pens within the carriage, the pens must be fluidically connected to trailing tubes. The pens usually interface with some type of valve on the ends of the tubes. The pens make connection with these valves when they are inserted into the carriage stall. However, if the pen and valve interface is not correctly designed, the forces exerted on the pen during fluid interconnection will counteract the precision positioning of the datums, resulting in the pens being misaligned. The fluid interconnection mechanism must be designed so as to not act against the precise positioning resulting from the interaction of the datums.

Recent advances in printhead construction have allowed printheads to be designed to be a permanent or semi-permanent part of the printer, with separate ink cartridges that are fluidically connected in some fashion to the printhead.

Although the pens are preferably a permanent fixture in the printer, rather than being disposable, it is likely that many such pens will fail before the end of the life of the printer. Therefore, some provision must be made so that the pen can be removed and replaced with a new one. The mechanical datum system and fluid interconnect must also allow the new pen to be reliably and precisely positioned during such replacement. The system would be preferably designed so that installation and subsequent replacements could be done by a purchaser or by a field repair person away from factory conditions.

SUMMARY OF THE INVENTION

The invention provides an inkjet printing mechanism designed to receive an ink jet pen having a needle and a shroud surrounding the needle, the shroud attached to the pen by means of a neck, the pen also having pen datums configured for positioning the pen within a printer carriage. The printer includes a printer chassis and a media movement mechanism mounted to the chassis and constructed to position a print medium in a print zone. A carriage is mounted to the chassis and is constructed to receive the pen and to position the pen over the print zone. The carriage has a notch configured to receive the neck when the stall receives the pen. A valve is movably attached to the carriage and is configured to move with respect to the carriage to be received by the shroud when the notch receives the neck. A septum is positioned on the valve and configured such that when the valve is received by the shroud, the septum is pierced by the needle. A set of carriage datums is formed in the stall and configured to interface with the pen datums. A latching mechanism is associated with the carriage and constructed to seat the pen datums against the carriage datums to finely position the pen with respect to the carriage.

The invention also provides a method of installing an inkjet pen into a carriage of an inkjet printing mechanism. The method includes the steps of: placing the pen in a stall of the carriage to guide a neck on the pen into a notch formed in the carriage; moving the pen further into the stall and by means of registration of the pen with walls of the pen stall, guiding a shroud on the pen over a valve; urging the pen further into the stall until pen datums formed on the pen come into contact with carriage datums formed in the stall; and seating the pen datums against carriage datums to finely position the pen within the carriage;

The invention thus provides for reliable insertion of inkjet pens within their respective carriage stalls, with successive guiding mechanisms for aligning various parts of the pen with corresponding parts of the carriage. The invention allows for installation or replacements of pens to be reliably and easily done by a purchaser or by a field repair person away from factory conditions.

According to a second aspect of the present invention, there is provided a printer in which an inkjet printhead may be primed without removing the printhead from a carriage of the printer, the printer comprising a source of gas capable of delivering a predetermined controlled volume of gas at a pressure above ambient pressure, a carriage for holding at least one printhead and having coupling means for coupling a vent on the printhead to the source of gas, and a controller for controlling the priming of a printhead by the application of a controlled predetermined volume of gas to a printhead mounted in the carriage.

In a presently preferred embodiment of the invention a unitary latching device is provided which moves between an open position allowing individual inkjet print cartridges to be installed, removed or replaced and a closed position securely positioning a plurality of the print cartridges in a carriage during printing, replenishming and servicing modes. The latching device may include a pivotally mounted cover having individually spring loaded bars which protrude downwardly to engage a crown portion of the print cartridge and provide vector forces which hold positional datums on the print cartridge against matching datum surfaces on the carriage.

When the latching device is in closed position, the plurality of print cartridges are collectively held in the carriage in a manner which prevents manual interference in order to accomplish the following functions: printing as a result of a secure electrical interconnect contact through conductive pads on a print cartridge; ink replenishment as a result of a secure fluid interconnect between a reservoir inside the print cartridge and an external ink supply; and servicing of the printhead. In one embodiment such printhead servicing includes priming the print cartridge through air conduits in the cover which are in aligned engagement with a vent in the printhead when the latching device is in closed position.

The latching device can be manually disengaged in order to be moved from the closed position to an open position which allows easy access to each of the plurality of print cartridges for purposes of removal and replacement.

DETAILED DESCRIPTION OF THE ILLUSTRATED EMBODIMENTS

Figure 1:
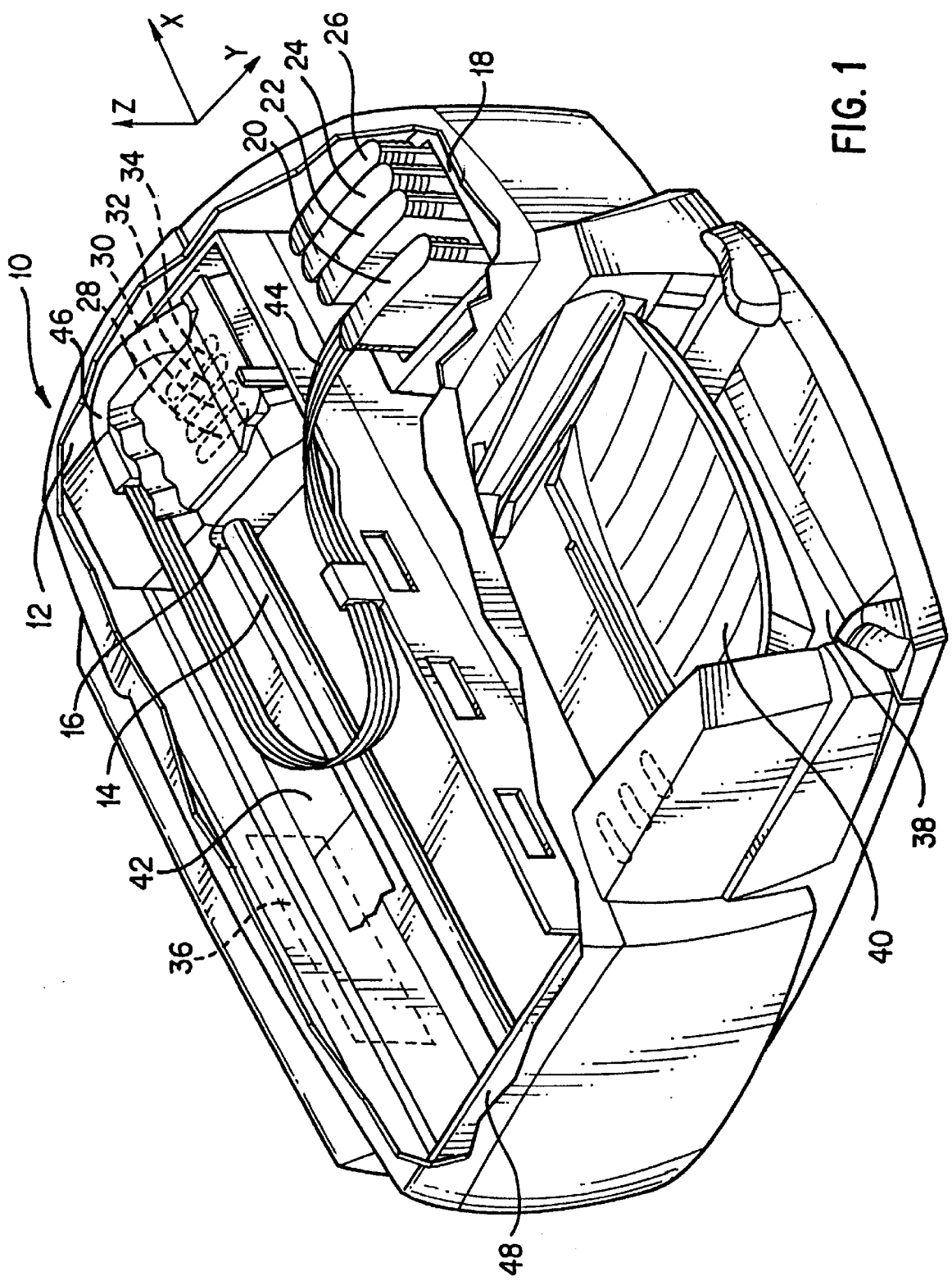
FIG. 1 is a perspective view of an inkjet printer having an ink replenishment system for multiple printheads removable mounted in a carriage.

FIG. 1 is a cutaway view of a printer 10 of the invention. Printer 10 includes a chassis 12, carriage rod 14, carriage 16, ink cartridge stall 18, ink cartridges 20, 22, 24, 26, printheads (pens) 28, 30, 32, 34 (shown in outline), controller 36 (show in outline), input tray 38, and output tray 40. Controller 36 communicates with pens 28, 30, 32, 34 by means of a flex strip 42, in a manner well known in the art. Ink cartridge 20 holds black ink, cartidge 22 holds cyan ink, cartridge 24 holds magenta ink, and cartridge 26 holds yellow ink. Similarly pen 28 prints black dots, pen 30 prints cyan dots, pen 32 prints magenta dots, and pen 34 prints yellow dots. Ink is fed from ink cartridges 20, 22, 24, 26 to pens 28, 30, 32, 34 by means of tube assembly 44. Tube assembly 44 connects with manifold 46, and inside manifold 46 the individual tubes carrying the four colored inks are separately routed to their respective valving mechanisms so that ink can be fed to the pens. Carriage 16 is shown in FIG. 1 in its "home" position at the right side of the print zone. The print zone resides between this home position and the left side 48 of chassis 12.

Carriage 16 rides along carriage rod 14 and traverses in the direction labeled X back and forth to thereby scan the pens across the print zone as dots are laid down on the page in a dot matrix pattern. For this reason, the direction X is commonly referred to as the carriage axis or scan axis.

After a print swath is complete, the paper or other print media is incrementally moved in the direction labeled Y, so that another print swath can be printed. Subsequent contiguous swaths are printed to print entire pages of text or images in a manner well known in the art. The direction orthogonal to directions X and Y will be referred to herein as the Z axis. After a page of information is printed, the page is ejected onto the output tray 40, and a new sheet is "picked" from the input tray so that it can be printed on.

Figure 3:
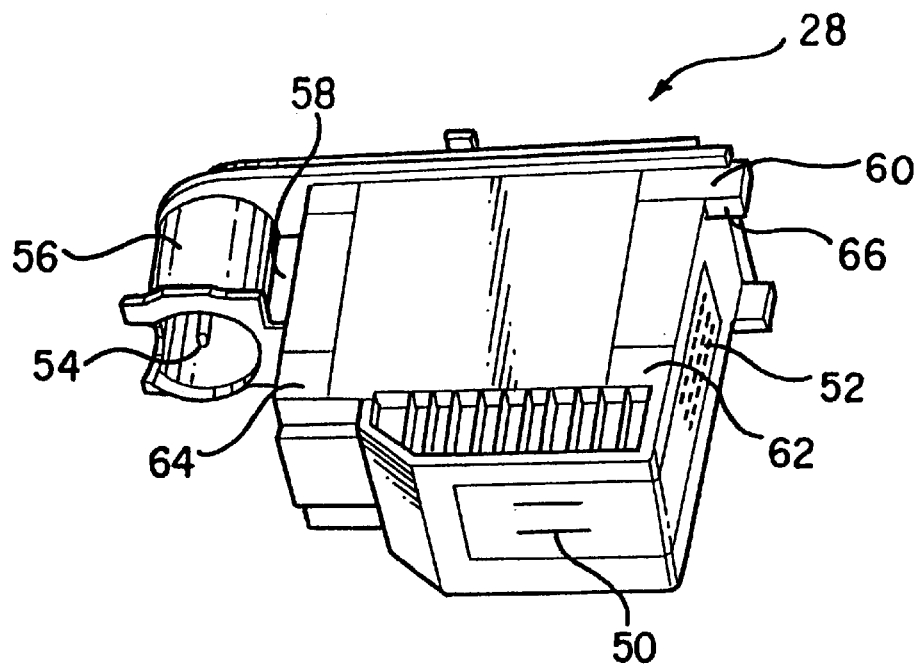
FIGS. 3 and 4 are bottom perspective views of one version of a print cartridge incorporating features of the invention.
Figure 4:
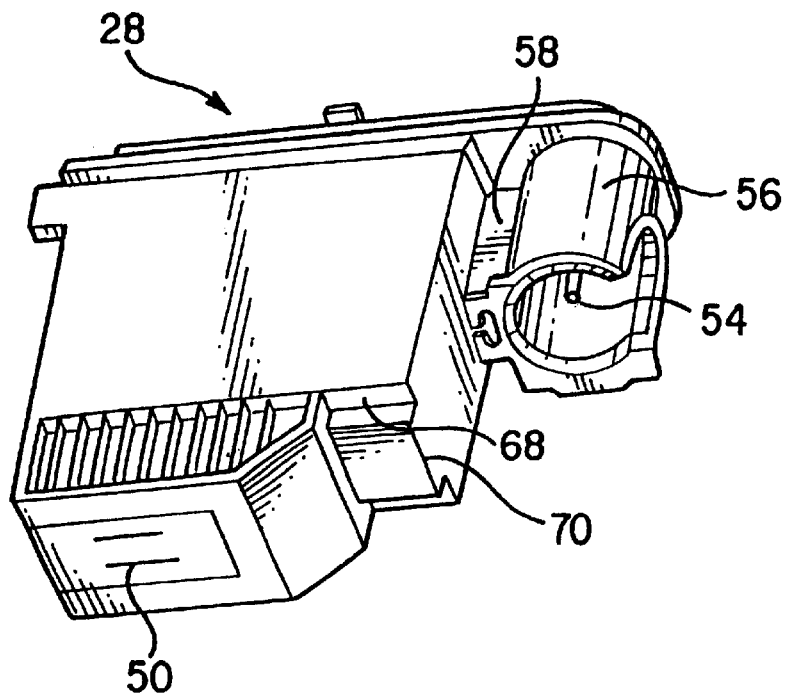

FIGS. 3 and 4 illustrates pen 28 in detail, and is typical of pens 28, 30, 32, 34. This pen includes printhead nozzles 50, electrical interconnect pads 52, fluid interconnect needle 54, shroud 56, and neck 58. Pen 28 has X datums 60, 62, 64; Z datums 66 and 68; and Y datum 70. Contact pads 52 interface with a set of matching contact pads in the printer so that the printer can provide firing signals to the pen. Based on these firing signals, droplets are ejected from nozzles 50. Needle 54 interfaces with a septum, described later, to provide a supply of ink to the pen. Shroud 56 covers and protects needle 54. Both shroud 54 and neck 58 serve to guide the needle into its interface with its septum. These functions are described more completely below.

Figure 2:
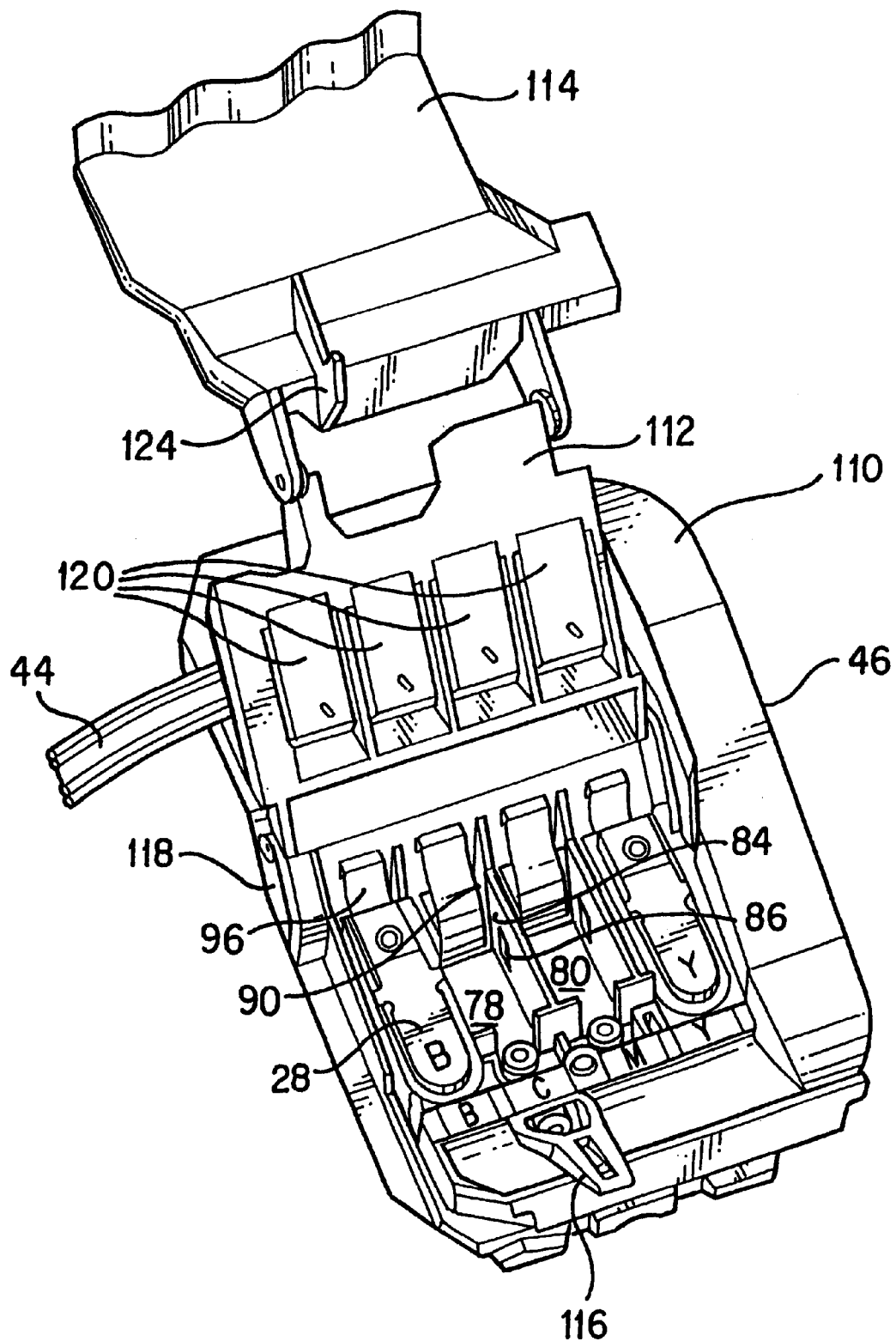
FIG. 2 shows one embodiment of a carriage incorporating features of the invention, with a latching device in open position, and black and yellow print cartridge in the carriage chutes with their print cartridge handles down.
Figure 8:
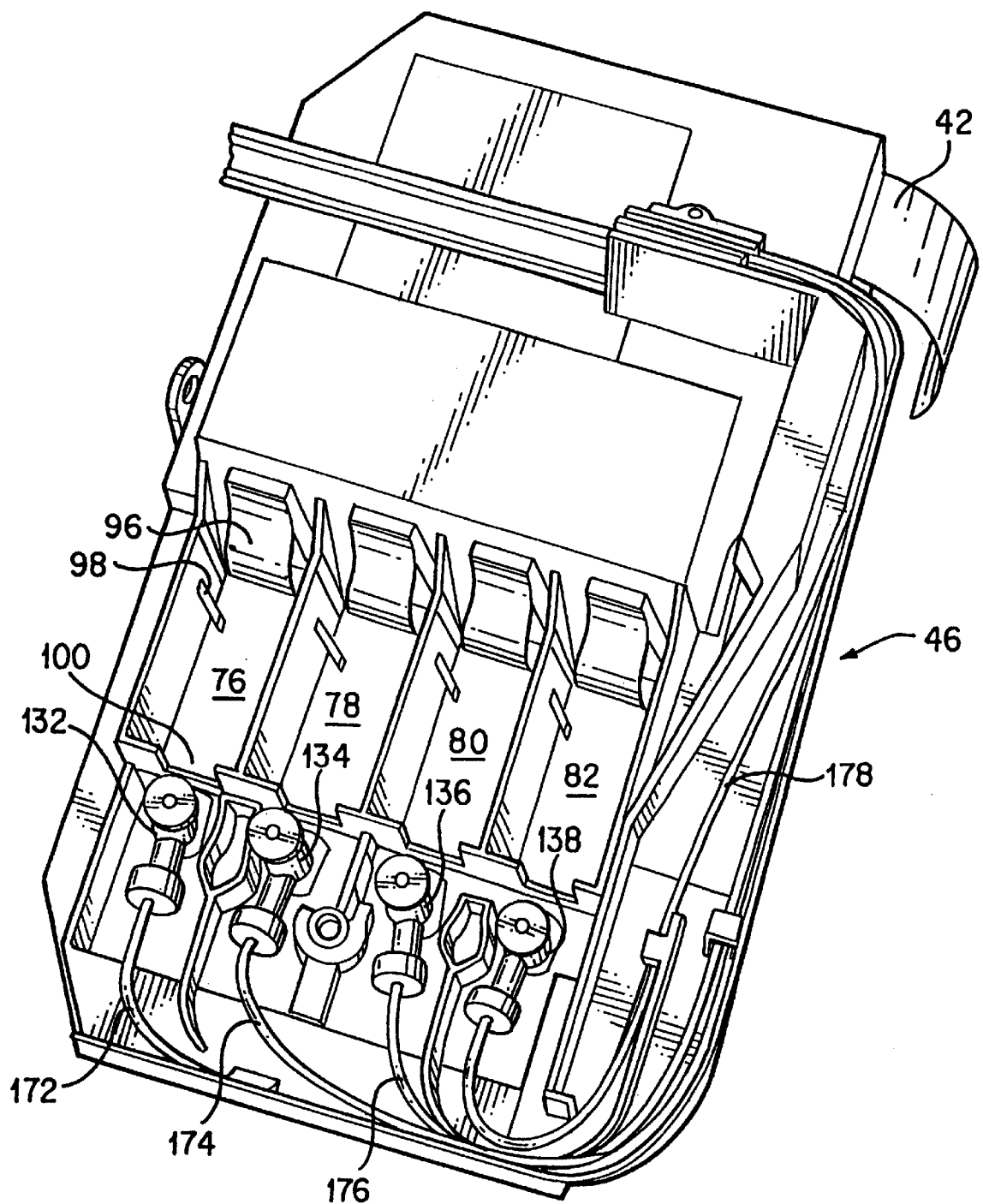
FIG. 8 a partially cut-away top view of the carriage with the print cartridges removed, showing the ink replenishment tube routing.

FIGS. 2 and 8 illustrate details of carriage 16, and includes pen stalls 76, 78, 80, 82. Pens 28, 30, 32, 34 are installed into stalls 76, 78, 80, 82, respectively. Stall 76 is typical and will be described in detail. Stall 76 includes X, Y, and Z datums that correspond directly with the X, Y, and Z datums on pen 28, described in reference to FIGS. 3 and 4. For example, in FIG. 2, X datums 84, 86 and Z datums 90 are visible in stall 78, which datums correspond to the datums on pen 30. Stall 76 also includes contact pads 96 and notch 100. A spring is positioned behind contact loads 96 to bias the contact pads outward, or in the direction of the notch 100.

As pen 28 is installed into stall 76, neck 58 fits into notch 100. As the pen is further installed, spring 98 urges the pen toward the right (as viewed in FIGS. 3 and 4) to bias X pen datums 60, 62, and 64 against the X carriage datums to position the pen in the X direction within the carriage. Carriage contact pads 96 engage with pen contact pads 52, so that the printer can communicate with the pen. Also, because of the spring behind contact pads 96, Y pen datum 70 is urged against its carriage datum to position the pen in the Y direction. By means of a latch mechanism described below, Z pen datums 66 and 68 are urged against the Z carriage datums to position the pen in the Z direction. Thus the pen is precisely positioned in the X, Y, and Z directions with respect to carriage 16 so that droplets are accurately deposited on the page in their intended location.

FIG. 2 and FIGS. 5–7 illustrate details of the latching mechanism that latches pens 28, 30, 32, and 34 into their respective stalls so that the pen datums are all firmly held into position against their respective carriage datums. This mechanism includes a carriage chassis 110, latch 112, handle 114, and pivot arm 116. Carriage chassis rides along carriage rod 14 at hole 118. A set of contact arms 120 is pivotally connected to latch 112, as shown, and a spring (not shown) is mounted behind each of contact arms 120 to urge contact arms 120 outward or away from latch 112. Handle 114 includes a hook 124, designed to interlock with pivot arm 116, as described below. Latch 112 is pivotally attached to carriage chassis 110, and handle 114 is in turn pivotally attached to latch 112, as shown. Pivot arm 116 is pivotally attached to carriage chassis 110, as shown.

Figure 5:
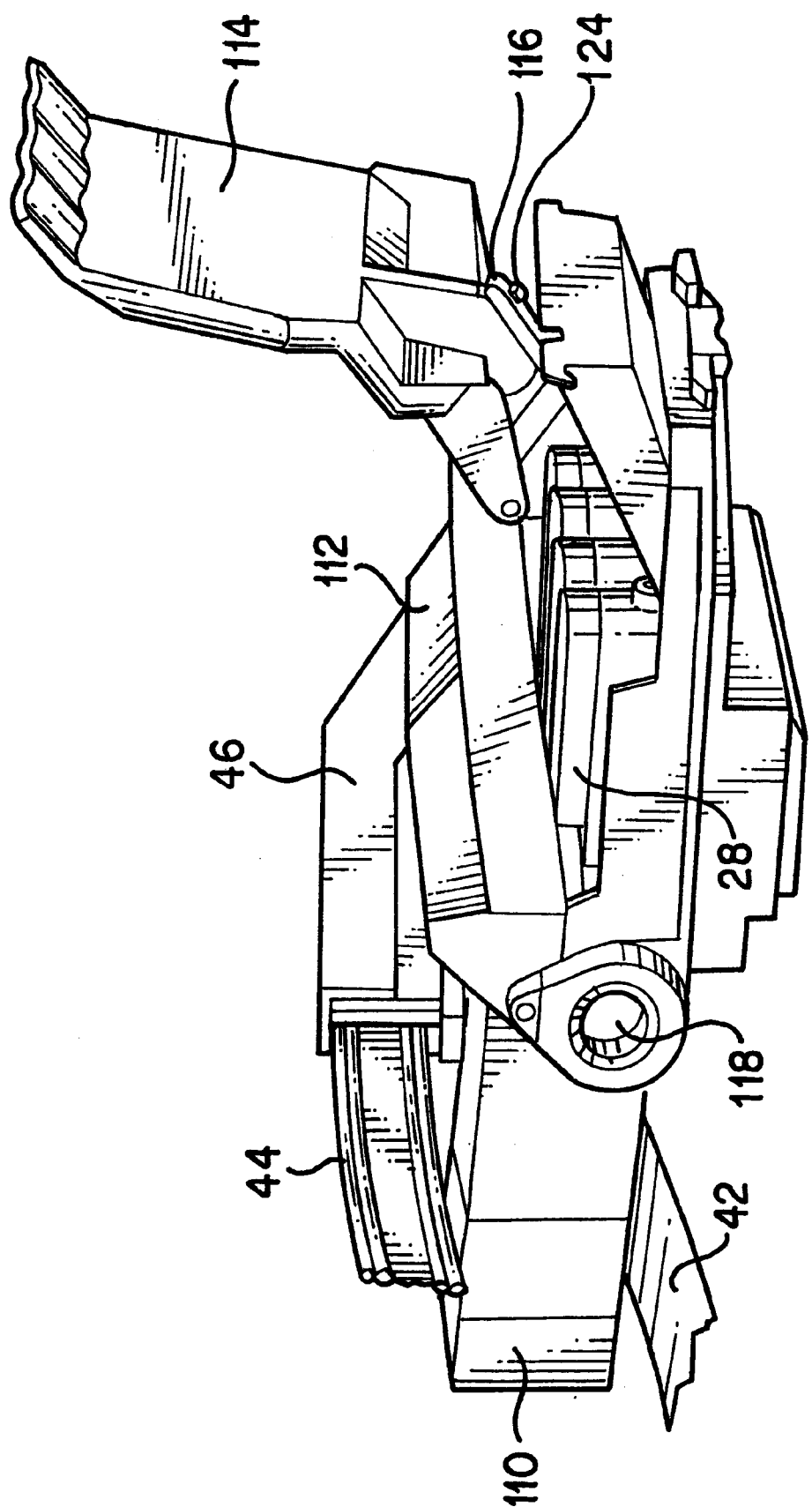
FIG. 5 is a respective view showing four print cartridges in the carriage chutes, with the latching device in intermediate position.

FIG. 2 shows the latch mechanism in its fully open position, with latch 112 flipped back toward the rear of the printer and handle 114 rotated back behind latch 112. Pivot arm 116 is rotated forward out of the way. With the latch mechanism in this position, pens can be installed or exchanged. FIG. 5 shows the latch mechanism in a second position in which latch 112 is rotated forward (clockwise as viewed in FIG. 5) so that contact arms 120 are pushing against the pens. Handle 114 is rotated so that hook 124 is interlocked with pivot arms 116. Handle 114 is held by the user to move the mechanism from the orientation shown in FIG. 2 to the one shown in FIG. 5. After hook 124 is interlocked with pivot arms 116, the user rotates handle 114 back toward the rear of the printer (or counterclockwise as viewed in FIGS. 2, and 5–7). As the handle is thus rotated, latch 112 will be urged downward so that contact arms 120 are urged against the pens by means of springs mounted behind each contact arm. As the user rotates handle 114 toward the position shown in FIG. 7, he will feel a force, resulting from the springs behind contact arms 120, urging the handle to rotate back to the orientation shown in FIG. 5.

Figure 6:
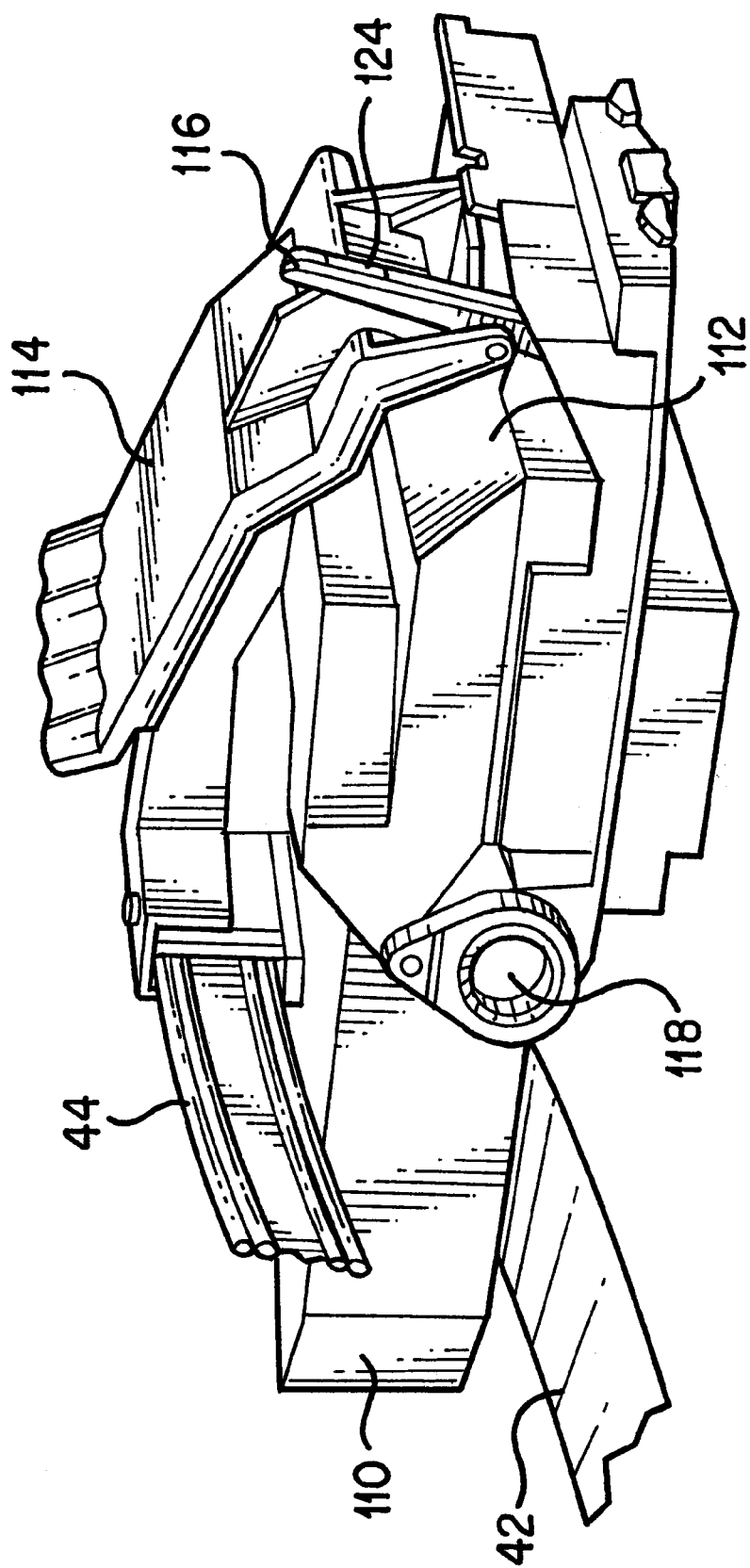
FIG. 6 shows the cover down on the print cartridges, with the latching device almost in closed position.
Figure 7:
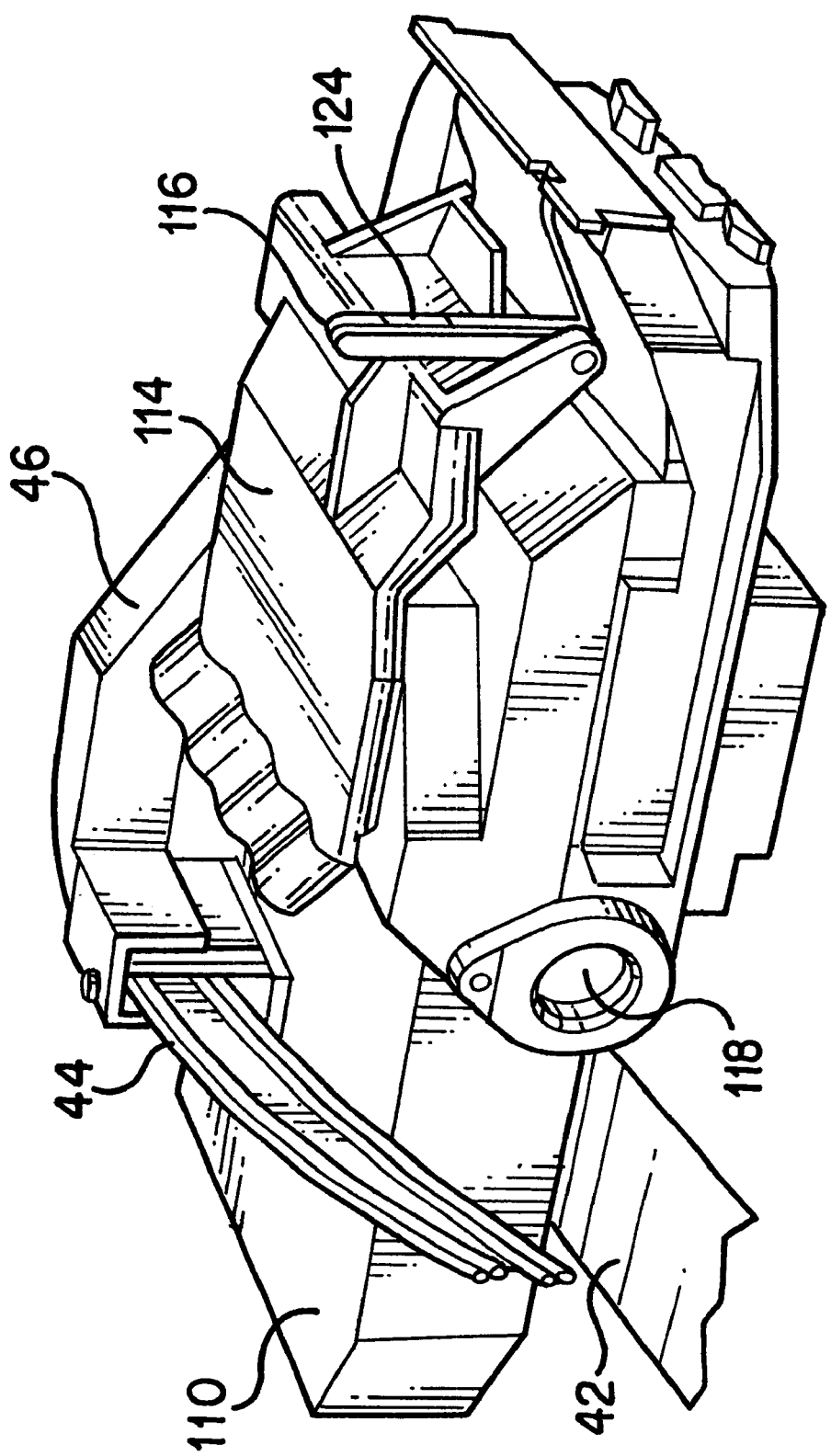
FIG. 7 shows the carriage with the latching device in closed position.

When the mechanism reaches the orientation shown in FIG. 6, the forces reach an equilibrium, and in this position, the mechanism may therefore be said to be moving through to an a over-center position. As the user continues to rotate handle 114 toward the position shown in FIG. 7, the forces resulting from the springs behind contact arms 120 will urge handle 114 to continue rotating, until the handle is in its position shown in FIG. 7. Thus, the orientation shown in FIG. 7 is in a stable energy state, and the handle is therefore in a locked position so that the pens are firmly held in place. The motion of the latching mechanism from the position shown in FIG. 5 to the position shown in FIG. 7 may be referred to as a latching motion. When it is desired to replace a pen, the user will rotate handle 114 back through the over-center position (FIG. 6), and back to the position shown in FIG. 5. The user will then rotate the handle 114 and latch 112 back to the position shown in FIG. 2.

In accordance with the design objectives, manifold 46 has various barriers, walls, and clips to channel the ink tubes. Tube 172 carries black ink, tube 174 carries cyan ink, tube 176 carries magenta ink, and tube 178 carries yellow ink. Each of the tubes has a different length, and the different lengths of the tubes assists in the assembly of the tubes and valves in the manifold 46. The valves 132, 134, 136, 138 are connected to tubes 172, 174, 176, 178, respectively before the tubes are inserted in the manifold.

The process for installing pens is now described. This description is given with regard to pen 28, with the understanding that the process for installing the other pens is the same. The user grasps one pen 28 with the needle and printing nozzles facing down as shown in FIG. 3 and begins to position it within its stall 76. Pen 28 is positioned so that pen contact pads 52 are closest to carriage contact pads 96. Spring 98 has a high spring tension and urges pen 28 to the right as viewed in FIG. 2. Because of the spring behind carriage contact pads 96, contact pads 96 also urge pen 28 toward the front of stall 76 (i.e., toward notch 100). Because of the frictional forces between the pen and the walls of the stall, the user will need to use some force to push the pen downward into its stall.

As the user further pushes pen 28 into its stall, neck 58 will engage within and interface with notch 100. As this happens, notch 100 positions shroud 56 over valve 132. As the user further pushes the pen down, shroud 56 will engage with valve 132 to locate valve 132 within shroud 56 and also positions needle 54 above septum and in position to pierce slit 150.

The other pens 28, 30, and 32 are similarly installed. At this point, the latching mechanism is used as described in reference to FIGS. 2, 5, 6 and 7 to latch the pens into their stalls and to firmly position the pen datums against their respective carriage datums. At this point, the pens are precisely located in their stalls in the carriage and the fluid interconnect is made, so that the printer is ready to print.

Figure 9:
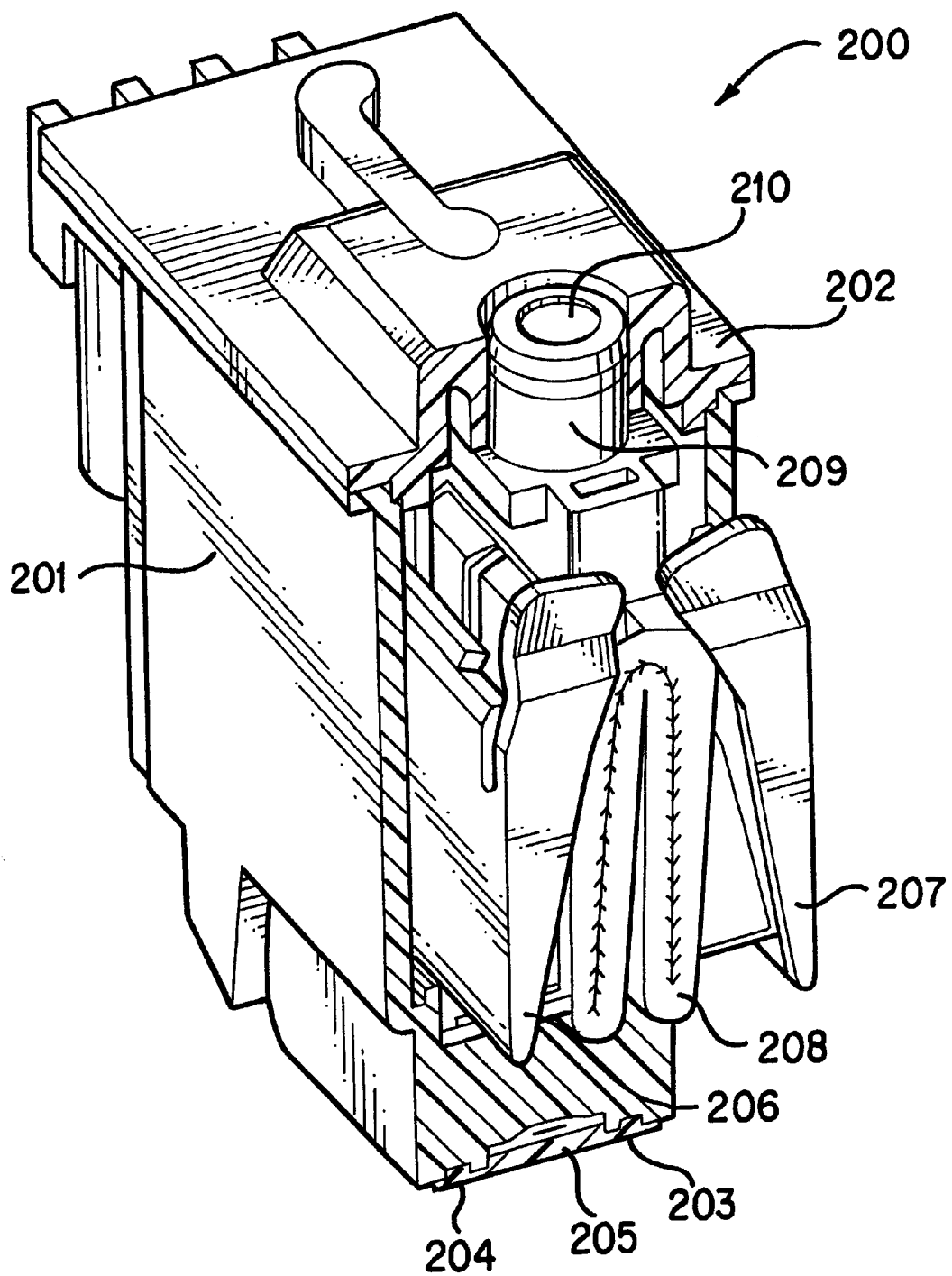
FIG. 9 is an enlarged perspective view of a print cartridge showing a partial cuat-away view of the ink valve actuator inside the reservoir.

Referring to FIG. 9, reference numeral 200 generally indicates the printhead that includes a body 201 and a crown 202 that forms a cap to the body and defines an ink chamber 232 with the printhead. Located at a remote end of the body is the tab head assembly 203 or THA. The THA includes a flex circuit 204 and a silicon die 205 that forms the nozzle plate. Also located within the pen body 201 is a regulator lever 206, an accumulator lever 207, and a flexible bag 208. In FIG. 9 the bag is illustrated fully inflated and for clarity is not shown in FIG. 10. The regulator lever 206 and the accumulator lever 207 are urged together by a spring 235, 235'. In opposition to the spring the bag spreads the two levers apart as it inflates outward. The bag is staked to fitment 209 that is press-fit into the crown 202. The fitment contains a vent 210 to ambient pressure in the shape of a helical, labyrinth path. The vent connects and is in gaseous communication with the inside of the bag so that the bag is maintained at a reference pressure during normal printing operations. The helical path limits the diffusion of water out of the bag and also serves to dampen the response rate of the levers 206, 207 to changes in the pressure differential between the ink chamber 232 and the ambient pressure.

Figure 11:
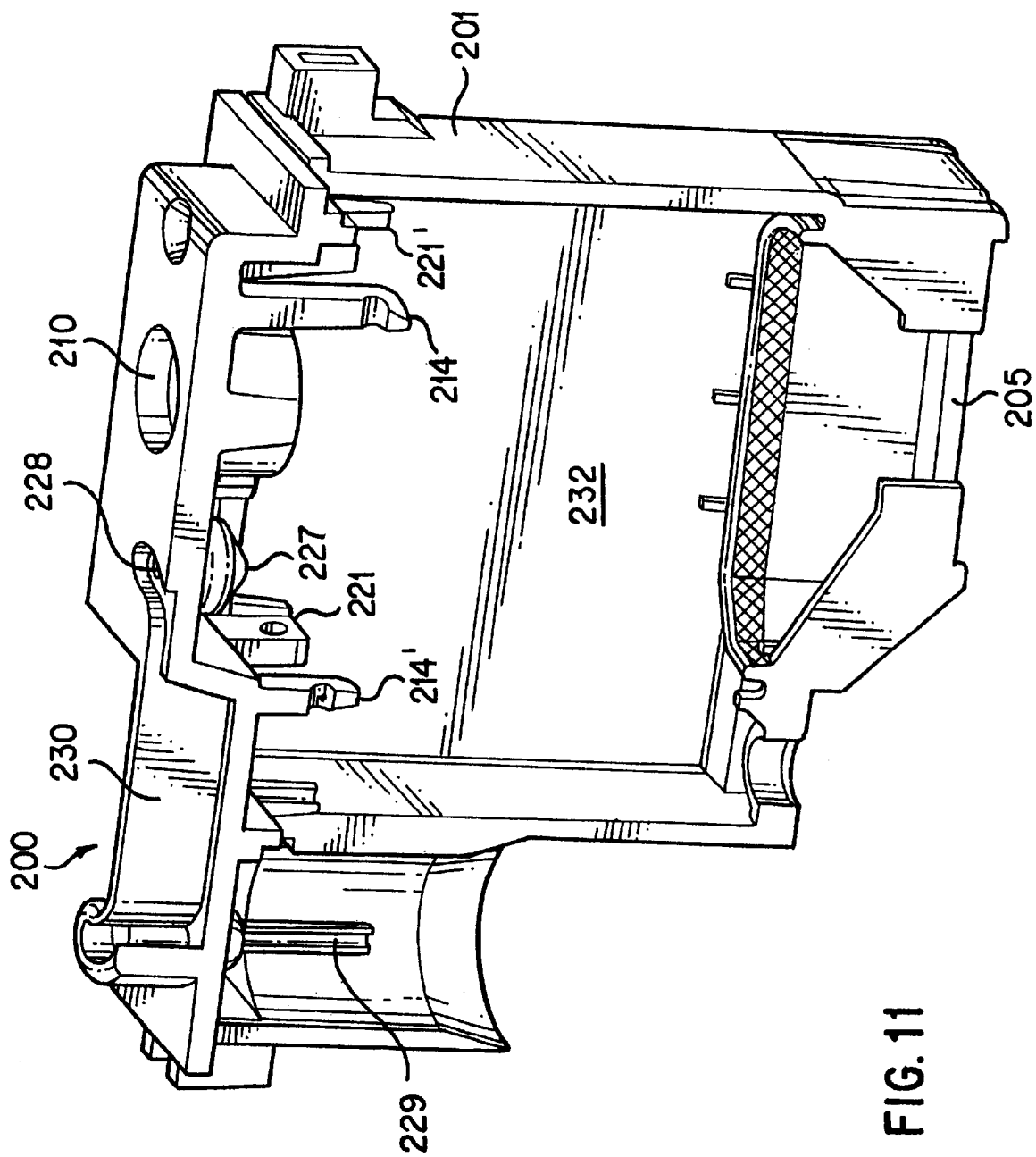
FIG. 11 is a sectional view of the print cartridge without the ink valve actuator.
Figure 15:
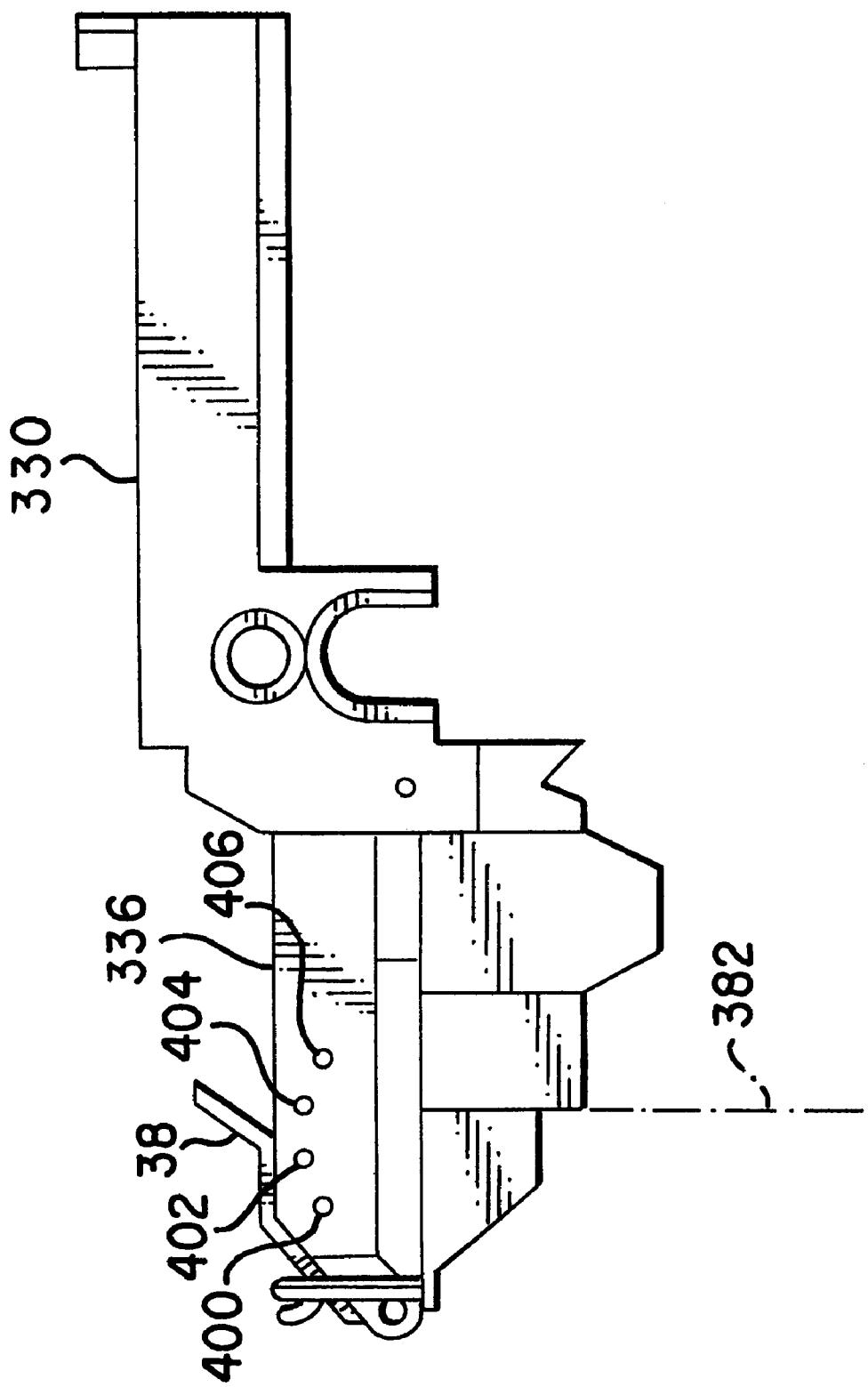
FIG. 15 is a side elevational view of the large format carriage with its latching device in closed position.

The accumulator lever 207 is illustrated in FIG. 9 and includes an actuation area 218 where the bag 208 directly bears against the lever. The lever rotates about two opposed axles 219, 219' that form an axis of rotation of the accumulator lever. The axles are remotely located on cantilevers 220 so that the axles and the cantilevers can be spread apart during manufacture and snapped into place on the mounting arms 221, 221' of the crown 202 as shown in FIG. 11. The accumulator lever also includes a spring boss 222 that engages the other end of spring 235. Like the spring boss 217 on the regulator, the boss 222 on the accumulator is protected during manufacture by the shoulders 224. These shoulders are not illustrated in FIG. 15.

Figure 10:
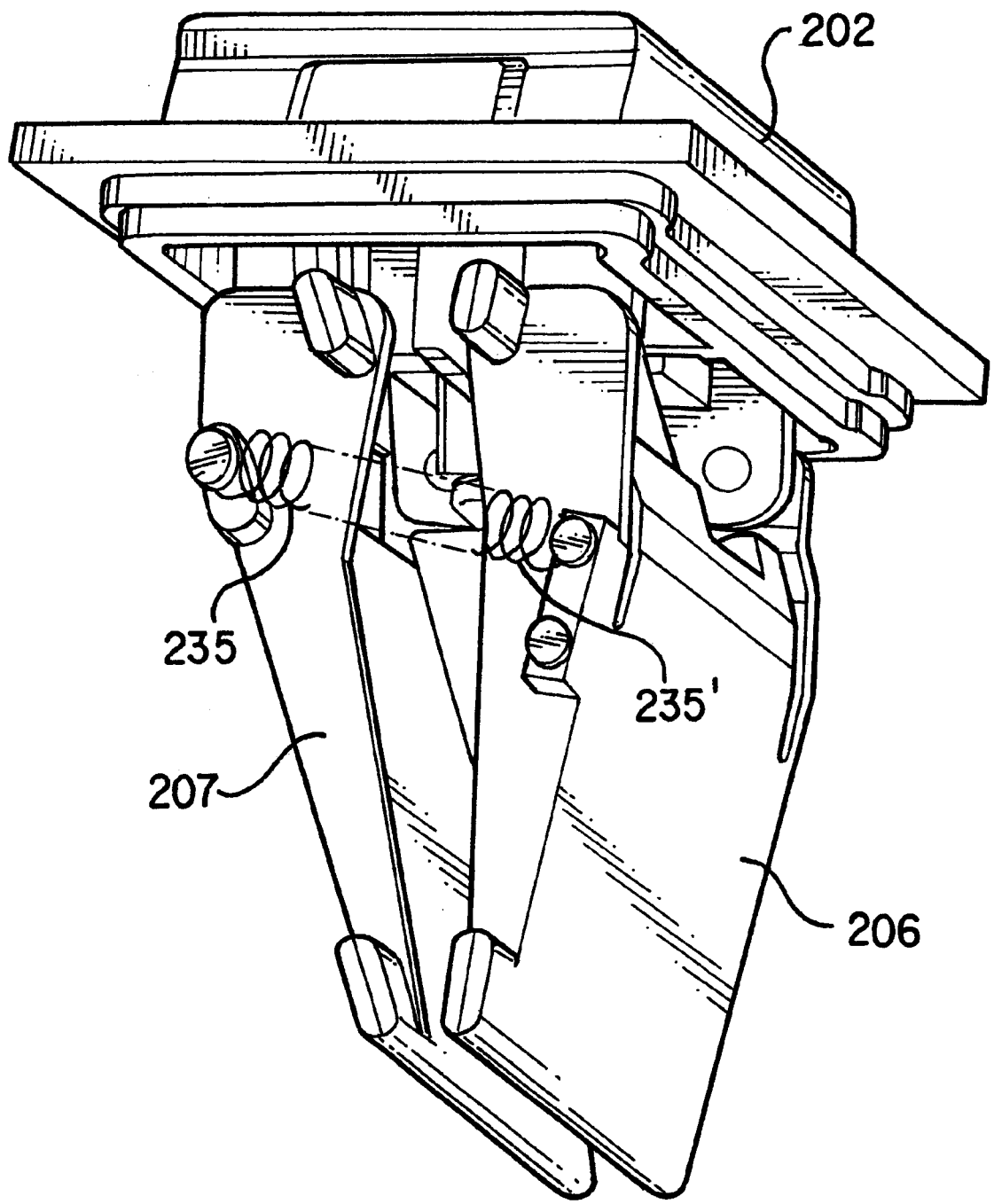
FIG. 10 is an enlarged perspective view of the ink valve actuator without the bellows.

Referring to FIG. 10 reference numerals 235 generally indicates a helical extension spring that urges the two levers 206, 207 together. The spring is preloaded and engages the bosses 217, 222 with a coil loop at each distal end. Each loop is a parallel cross-over, fully closed centred loop. This spring is designed to have the least amount of variation in its force constant over its full range of travel so that the back pressure can be regulated as closely as possible.

Figure 12:
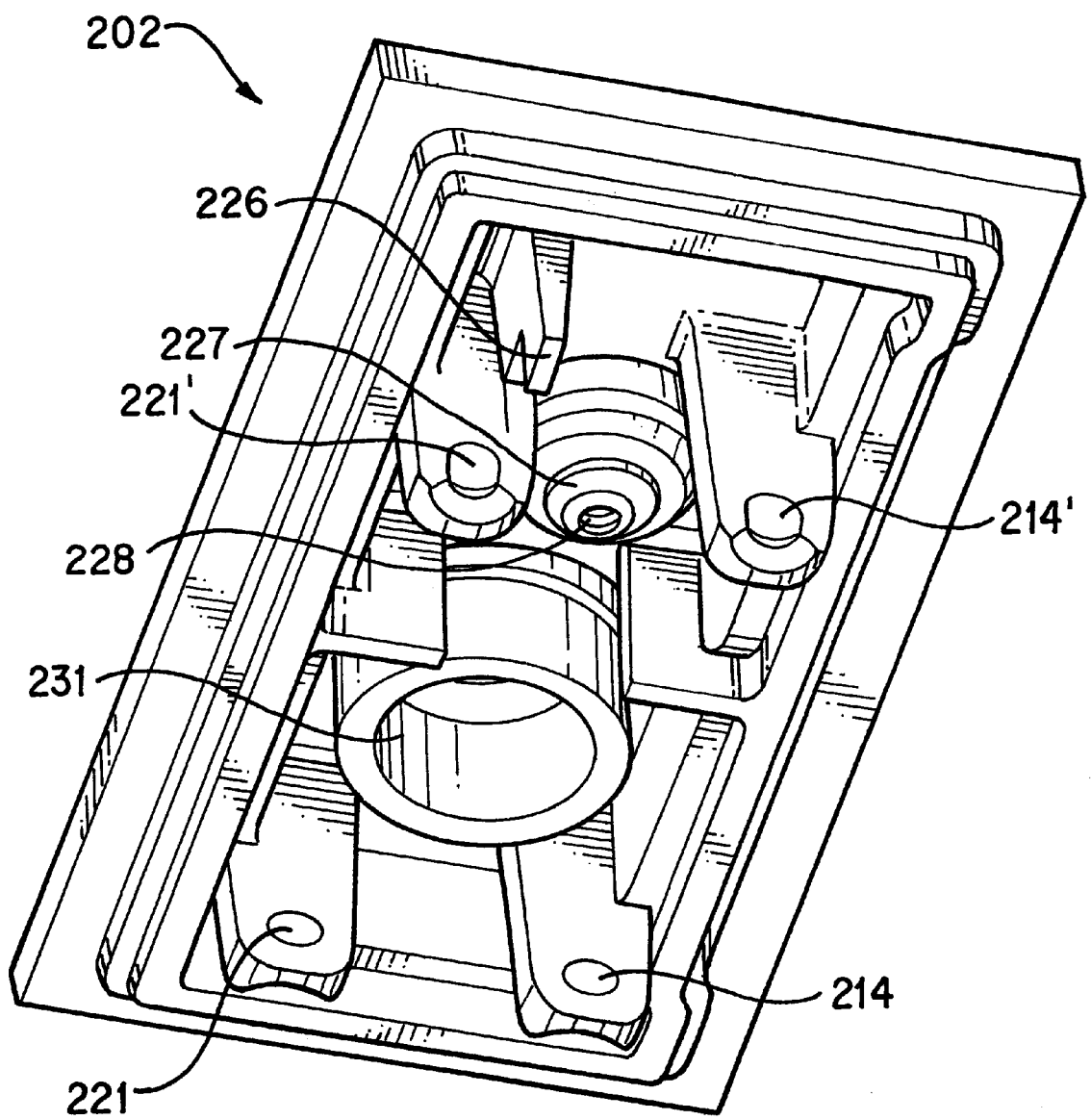
FIG. 12 is an enlarged bottom perspective view of the crown of the print cartridge.

FIG. 12 illustrates the bottom side of the crown 202 which includes a valve face 227 and the orifice 228 through which ink enters the ink chamber 232. The valve face mates with the valve seat 215 on the regulator lever 206. Ink flows through the fluid interconnect 229, the ink channel 230 and the orifice 228. At orifice 228 the ink flow into the ink chamber 232 is controlled by the regulator lever 206. The bag 208 is attached to a boss 231 which provides a gaseous communication path between the interior of the bag and ambient pressure via the vent 210 of the printhead. The axles 212, 212' on the regulator lever 206 are snapped into the journals 214, 214' as permitted by the cantilevered construction described above. In like manner the axles 219, 219' on the accumulator lever 207 are received in the journals 214, 214'. Also located bottom side of the crown is the surface 226 that engages the stop 225 on the accumulator lever 207. The stop 225 and the surface 226 prevent the accumulator lever from interfering with the regulator lever 206.

During normal printing the flexible bag 208 expands and contracts as a function of the differential pressure between the back pressure in the ink chamber 232 and ambient pressure communicated through the vent 210. The bag is shown inflated in FIG. 9. The bag is designed to push against the two levers 206, 207 with maximum contact area through the entire range of travel of the levers.

The accumulator lever 207 and the bag 208 under normal printing conditions operate together to compensate for changes in the ambient atmospheric pressure and thus to maintain a substantially constant negative i.e. below atmospheric pressure within the ink chamber 232 (known as the back pressure). Also the accumulator and bag are able to some extent to accommodate changes in the volume of any air that may be entrapped in the printhead (known as warehoused air).

Occasionally normal printing operation is suspended in order for one or more printheads to be serviced by the printer for example by performing spitting, priming and/or wiping operations. This many be initiated by the printer at regular intervals, only when a problem with a printhead is detected by the printer or as a result of a user request following detection by the user of a printing problem or by any combination of these circumstances.

In order to prime a printhead mounted within the printer carriage by the use of a carriage activated air pump 50, the pump is aligned to the air conduit connected to the vent 210 of the printhead.

The priming operation may be performed with a volume of air delivery to the bag. 208 of the printhead which is sufficient to cause movement of the accumulator lever 207 of the printhead but not cause any or insufficient movement of the regulator lever 206 so that the ink valve orifice 228 is not opened and the ink chamber 232 is not exposed to the pressure of the ink supply from the reservoirs.

However, it has been found for particular printhead designs and for particular ink types that it is advantageous to deliver a further controlled volume of air during priming so that the bag 208 expands to further increase the pressure within the ink chamber 232 and thus causes the regulator lever 206 to be rotated. It is important in these cases to control the supply pressure of ink from the remote reservoirs so as to prevent a large flow of ink into the printhead.

Figure 13:
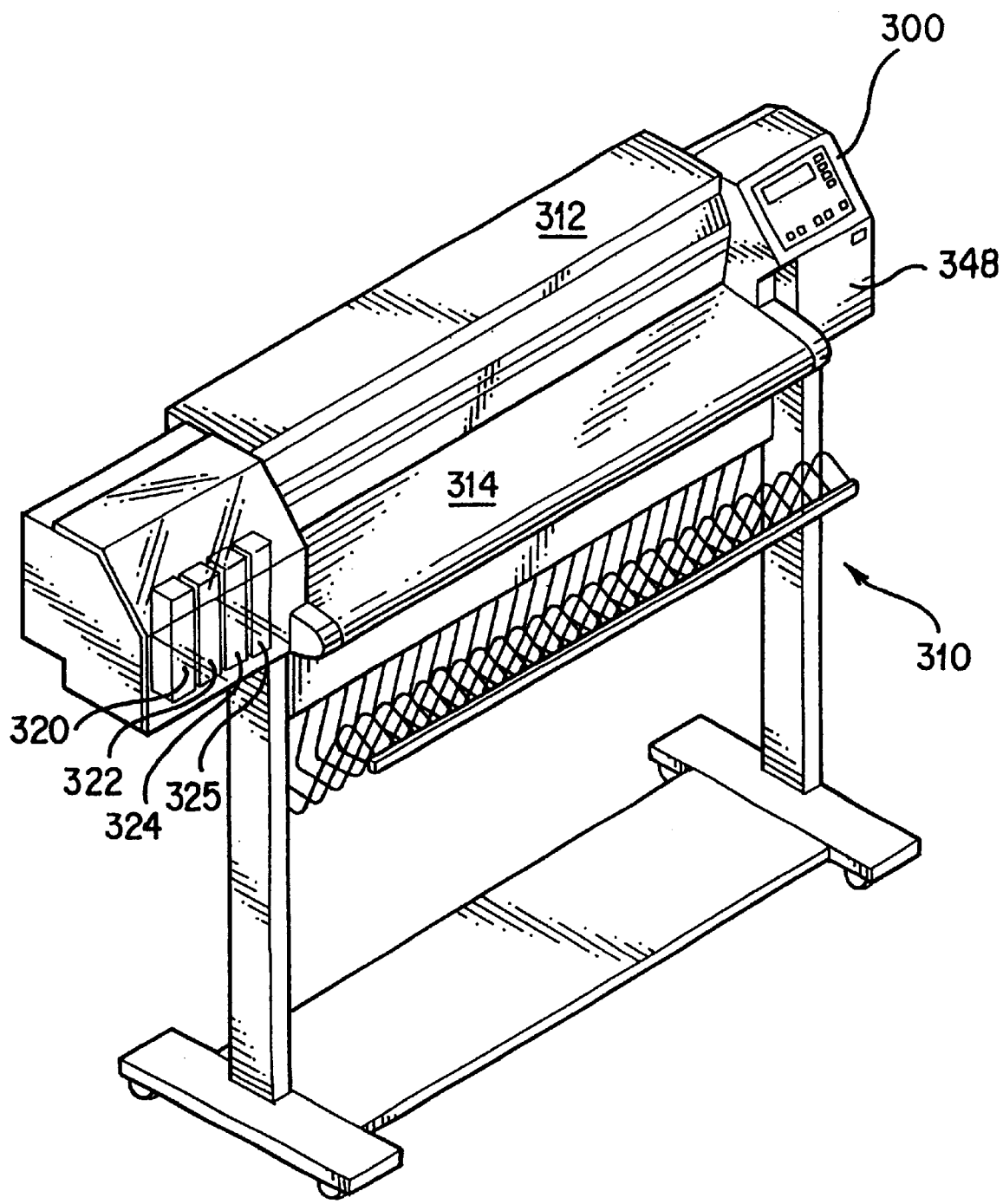
FIG. 13 is a perspective view of a large format inkjet printer with a different ink replenishment system and a different latching device.

FIG. 13 shows a large format printer 310 of the type which includes a transversely movable printhead carriage enclosed by a cover 312 which extends over a generally horizontally extending platen 314 over which printed media is discharged into a catcher basket. At the left side of the platen are four removable ink reservoirs 320, 322, 324, 326 which, through a removable flexible tube arrangement to be described, supply ink to four inkjet printheads mounted on the moveable carriage.

Figure 14:
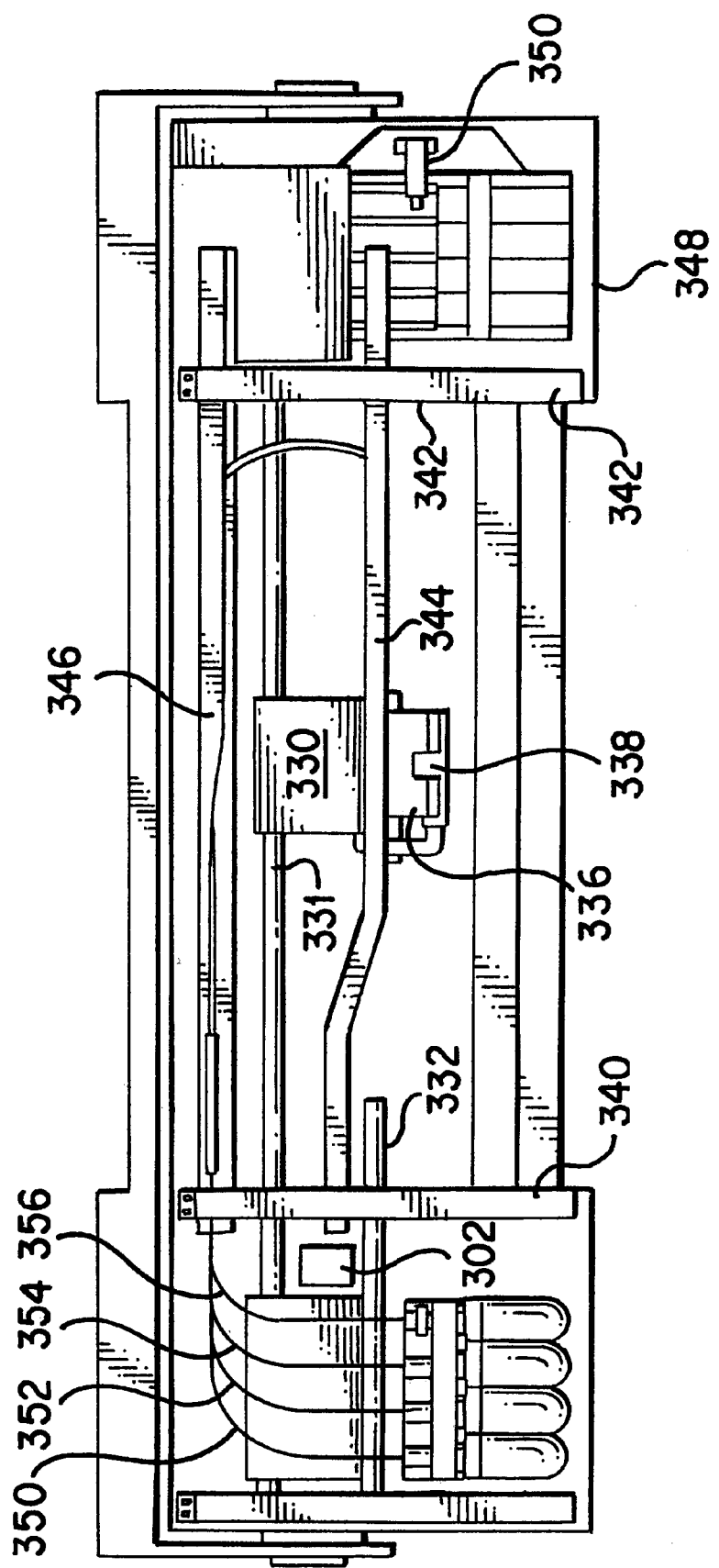
FIG. 14 is a top plan view of the large format inkjet printer with the top removed.
Figure 17:
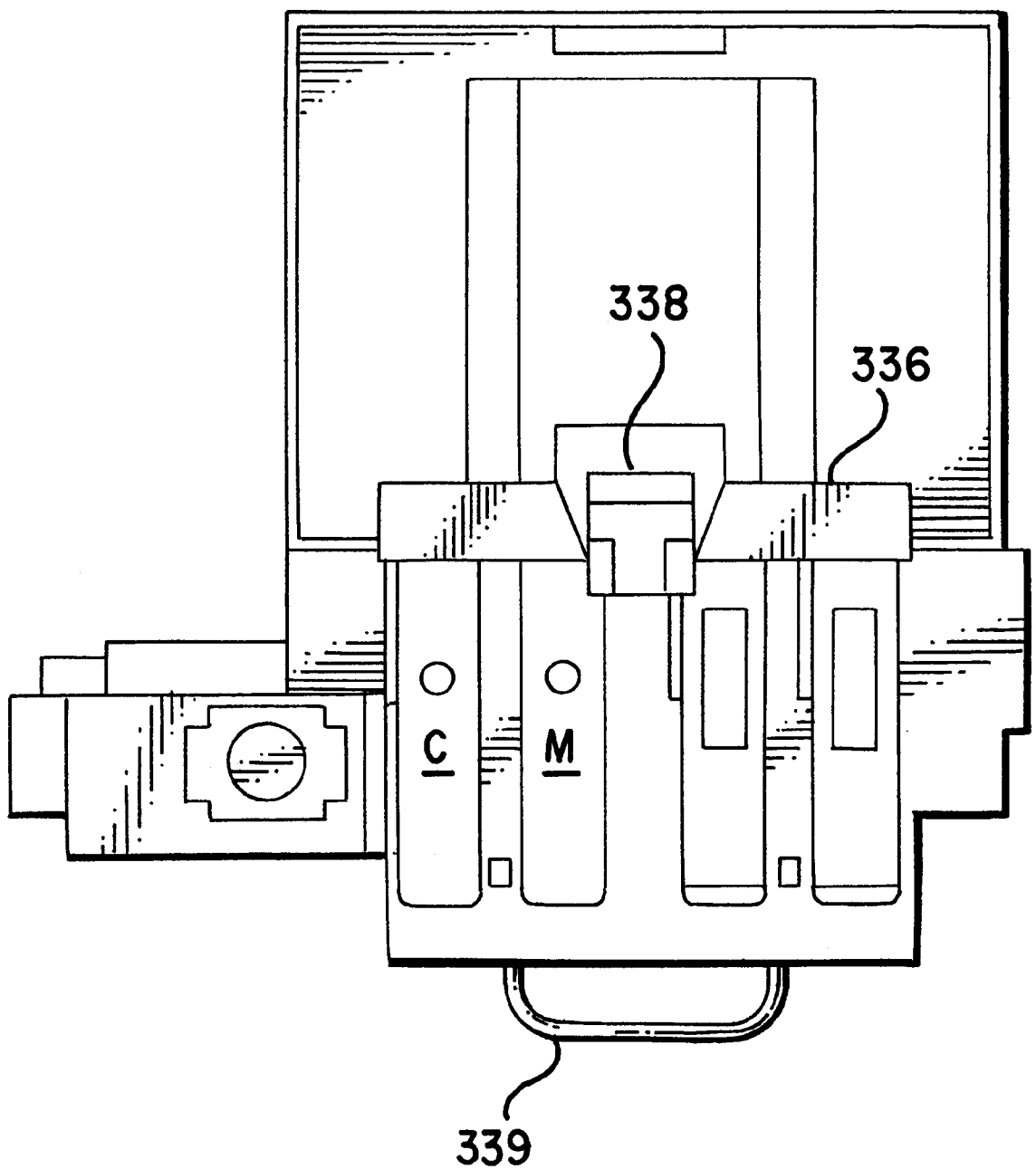
FIG. 17 is a top plan view with the latching device in open position, and with cyan and magenta print cartridges in the carriage chutes.
Figure 18:
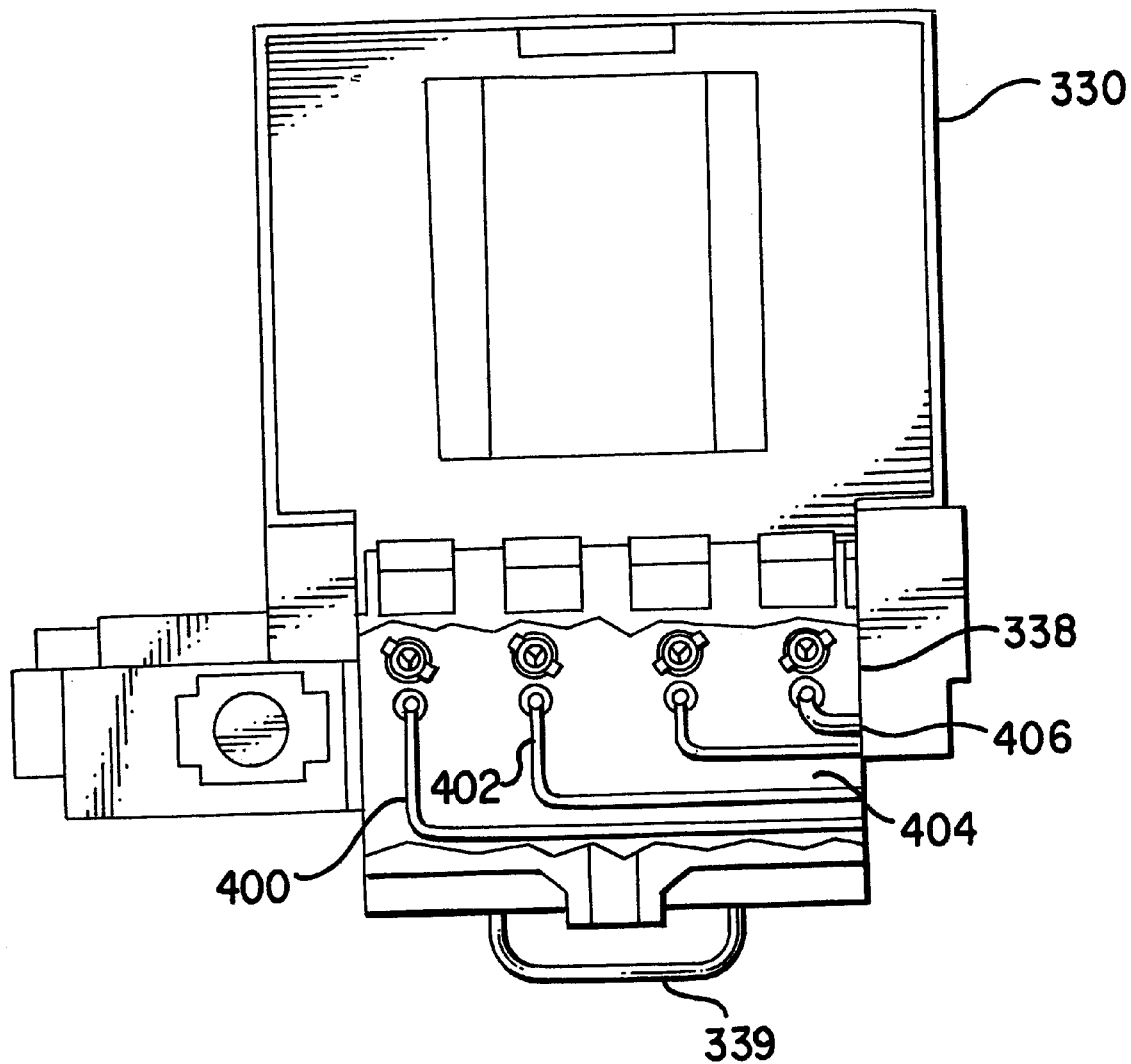
FIG. 18 is a partially cut-away top view of FIG. 17 showing the priming passages.

In the plan view of FIG. 14 in which the carriage cover 312 has been removed, it is seen that the printhead carriage 330 is mounted on a pair of transversely extending slider rods or guides 332, 334 which in turn are affixed to the frame of the printer. Also affixed to the frame of the printer are a pair of tube guide support bridges 340, 342 from which front and rear tube guides 344, 346 are suspended. The printhead carriage 330 has a pivotal printhead hold down cover 336 fastened by a latch 338 at the front side of the printer which securely holds four inkjet printheads, two of which is shown in FIG. 17 in place in stalls C, M, Y, K on the carriage. The front tube guide 344 is angled near the left bridge support 340 to provide clearance for opening the printhead cover 336 when the carriage is slid to a position proximate the left side of the platen 314 so that the printhead hold down cover 336 can be easily opened for changing the printheads.

A flexible ink delivery tube system conveys ink from the four separate ink reservoirs 320, 322, 324, 326 at the left side of the printer through four flexible ink tubes 350, 352, 354, 356 which extend from the ink reservoirs through the rear and front tube guides 344, 346 to convey ink to printheads on the carriage 330. The ink tube system may be a replaceable system.

Figure 16:
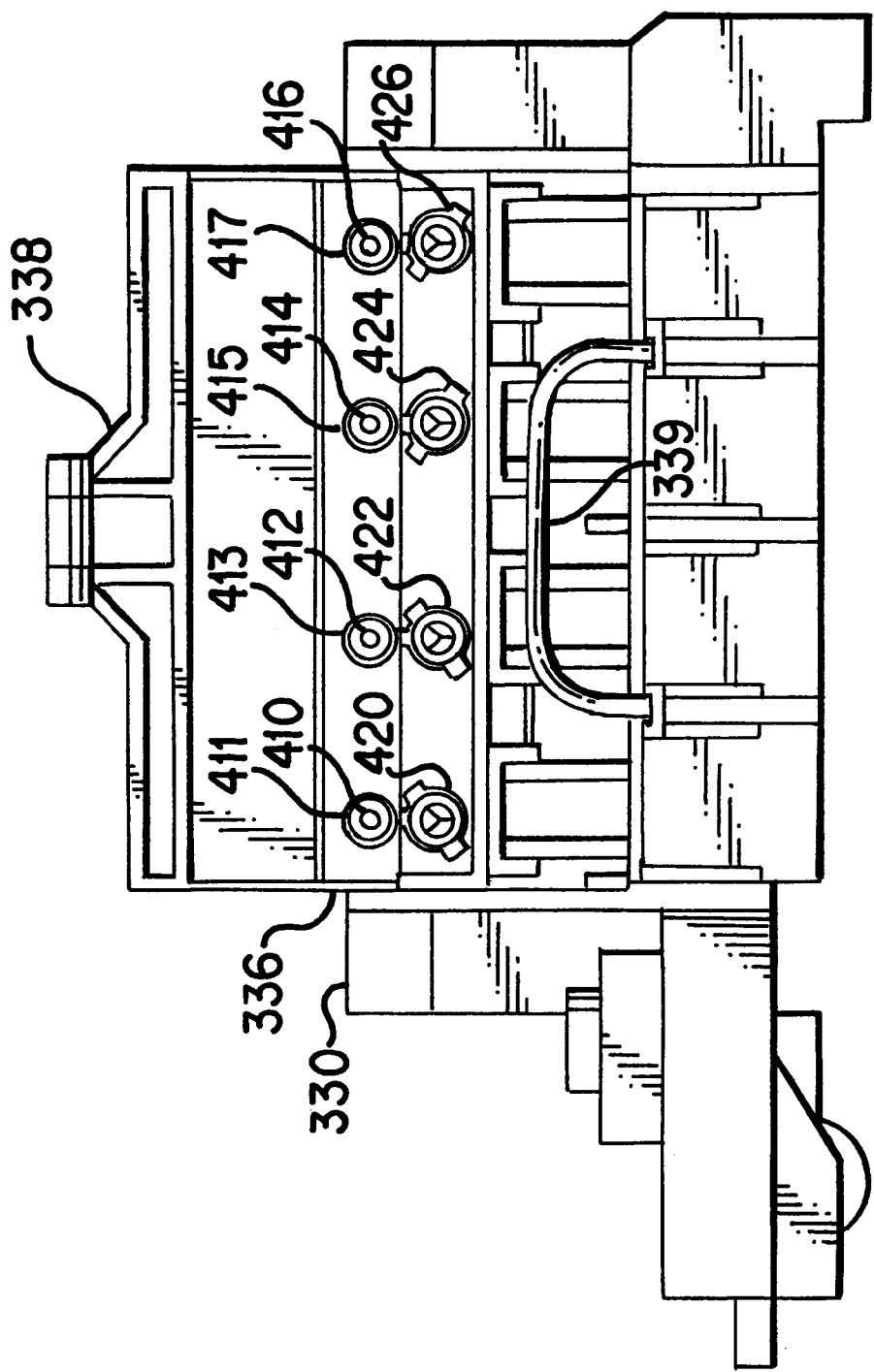
FIG. 16 is a front elevation view of the carriage with its latching device in open position.

At the right side of the printer is a printhead service station 348 at which the printhead carriage 330 may be parked for cleaning and priming the printheads. The printhead service station 348 is comprised of a plastic frame mounted on the printer adjacent the right end of the transversely extending path of travel of the printhead carriage 330. The printhead carriage 330 (FIGS. 16 and 17) includes four stalls C, M, Y, K which respectively receive four separate printheads containing colored ink such as cyan, magenta, yellow and black.

A printhead servicing pump 350 is mounted on the upper end of a pump positioning arm. Movement of the arm positions the pump at various locations along an arc centered on the pivot axis of the arm to align a pump outlet with the inlet end of one of four air conduits 400, 402, 404, 406 arcuately positioned on the side of a pivotally mounted printhead holddown cover 336 on the printhead carriage 330.

The four air conduits each 400, 402, 404, 406 are each sized to have a substantially equal volume and extend from the inlet ends at the side of the hold down cover 336 internally of the cover and terminate in downwardly directed (when the cover is closed) fluid outlets 410, 412, 414, 416 on the underside of the printhead holddown cover. The air outlets each haste a compliant seal 411, 413, 415, 417 therearound which mates with corresponding air inlet ports on the top surfaces of the four printheads when positioned in their respective stalls in the printhead carriage. Also shown on the underside of tile printhead holddown cover 336 are spring loaded printhead positioners 420, 422, 424, 426. It will be seen that the printhead holddown cover is pivotally connected to the carriage and fastened in its closed or printhead holddown position by a finger latch 338 and retainer 339.

Servicing of the printheads on the printhead carriage is accomplished by positioning the pump 350 for alignment with the air passageway 402, 404, 406, 408 in the printhead holddown cover which conveys air to the printhead to be serviced. This provides a fluid communication path from the pump to the vent 210 of the printhead for the purpose of priming while the printheads remain mounted within a stall of the carriage 330.

When printheads are mounted within a stall of the carriage 330 of the printer during non-priming, the vent 210 of the printhead is connected to ambient atmospheric pressure via one of the air conduits 400, 402, 404 or 406 in the printhead holddown cover 336. The fluid interconnect 229 of the printhead is connected by means of one of the flexible supply tubes 350, 352, 354, 356 to one of the four removable ink reservoirs 320, 322, 324, 326 located on the left side of the printer as seen in FIG. 13. Each ink reservoir is individually pressurised under control of the printer to deliver ink to an associated printhead. In normal printing operations the accumulator and regulator levers 207, 206 move within the printhead body 201 dependent on the ambient atmospheric pressure and speed of printing. If the atmospheric pressure increases, or the pressure within the ink chamber 232 decreases, for example, due to ink being ejected from the printhead during printing, the flexible bag 208 fills with air drawn through the air conduit in the carriage cover via the vent 210 of the printhead. Expansion of the bag 208 causes rotation of the accumulator lever 207.

FIGS. 19–22 show additional details of one embodiment of the ink supply interconnect from the flexible tubes to the printheads. Four tubes 536, each connected to an ink supply cartridge, are in fluid connection with a rubber septum 552 for each of the four stalls in the carriage. A hollow needle 560 formed as part of each print cartridge is inserted through the rubber septum 552 upon pushing the print cartridge into its associated stall within the carriage so that a fluid communication path exists between a particular ink supply cartridge 542–545 and a particular print cartridge for providing a supply of ink to the print cartridge.

Figure 19:
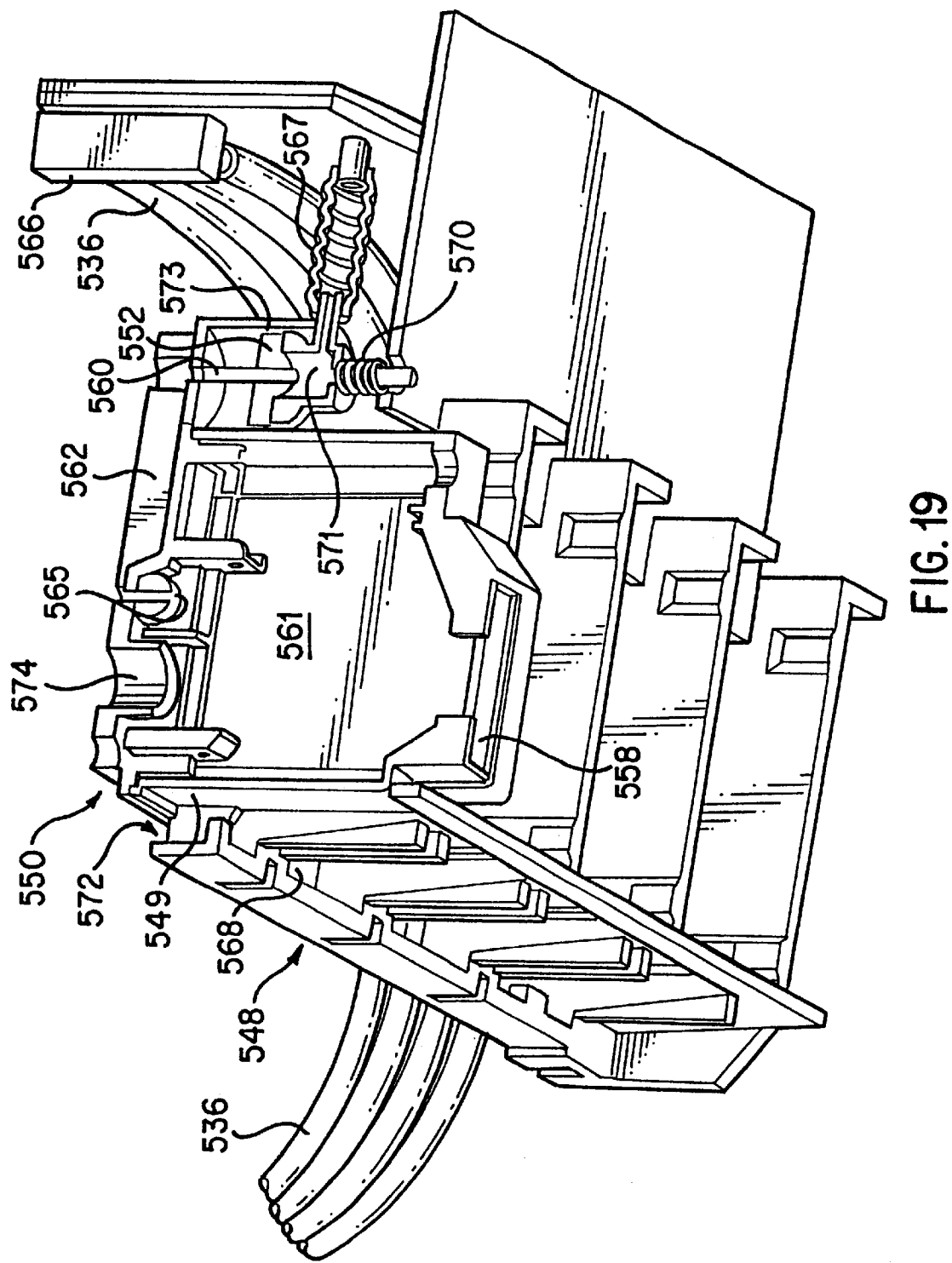
FIG. 19 is a bottom perspective view of another carriage having ink replenishment tubes and showing one print cartridge in cross section.

FIG. 19 is a perspective view looking up at carriage 548, showing print cartridge 550 and septum 552 in cross-section. This cross-section does not show a regulator valve within print cartridge 550 that regulates pressure by opening and closing hole 565. An opening in the bottom of carriage 548 exposes the printhead location 558 of each print cartridge 550. Carriage electrodes oppose contact pads located on print cartridge 550.

When the aforementioned regulator valve is opened, a hollow needle 560 is in fluid communication with an ink chamber 561 internal to print cartridge 550. The hollow needle 560 extends through a self-sealing slit formed through the center of septum 552. This self-sealing slit is automatically sealed by the resiliency of the rubber septum 552 when needle 560 is removed.

A plastic ink conduit 562 leads from needle 560 to ink chamber 561 via hole 565. Conduit 562 may also be integral to the print cartridge body. Conduit 562 may be glued, heat-staked, ultrasonically welded, or otherwise secured to the print cartridge body.

A septum elbow 571 routes ink from manifold 566 to septum 552 and supports septum 552. Septum 552 is affixed to elbow 571 using a crimp cap 573.

A bellows 567 (shown in cross-section) is provided for each of the individual stalls 568 for allowing a degree of x, y, and z movement of septum 552 when needle 560 is inserted into septum 552 to minimize the x, y, and z load on needle 560 and ensure a fluid-tight and air-tight seal around needle 560.

A spring 570 urges septum 552 upward. This allows septum 552 to take up z tolerances, minimizes the load on needle 560, and ensures a tight seal around needle 560. Slots 572 formed on each of the stalls 568 in carriage 548 align with tabs on each print cartridge 550 to restrict movement of the print cartridge 550 within the stall 568. An air vent 574 formed in the top of print cartridge 560 is used by a pressure regulator in print cartridge 550.

Figure 20:
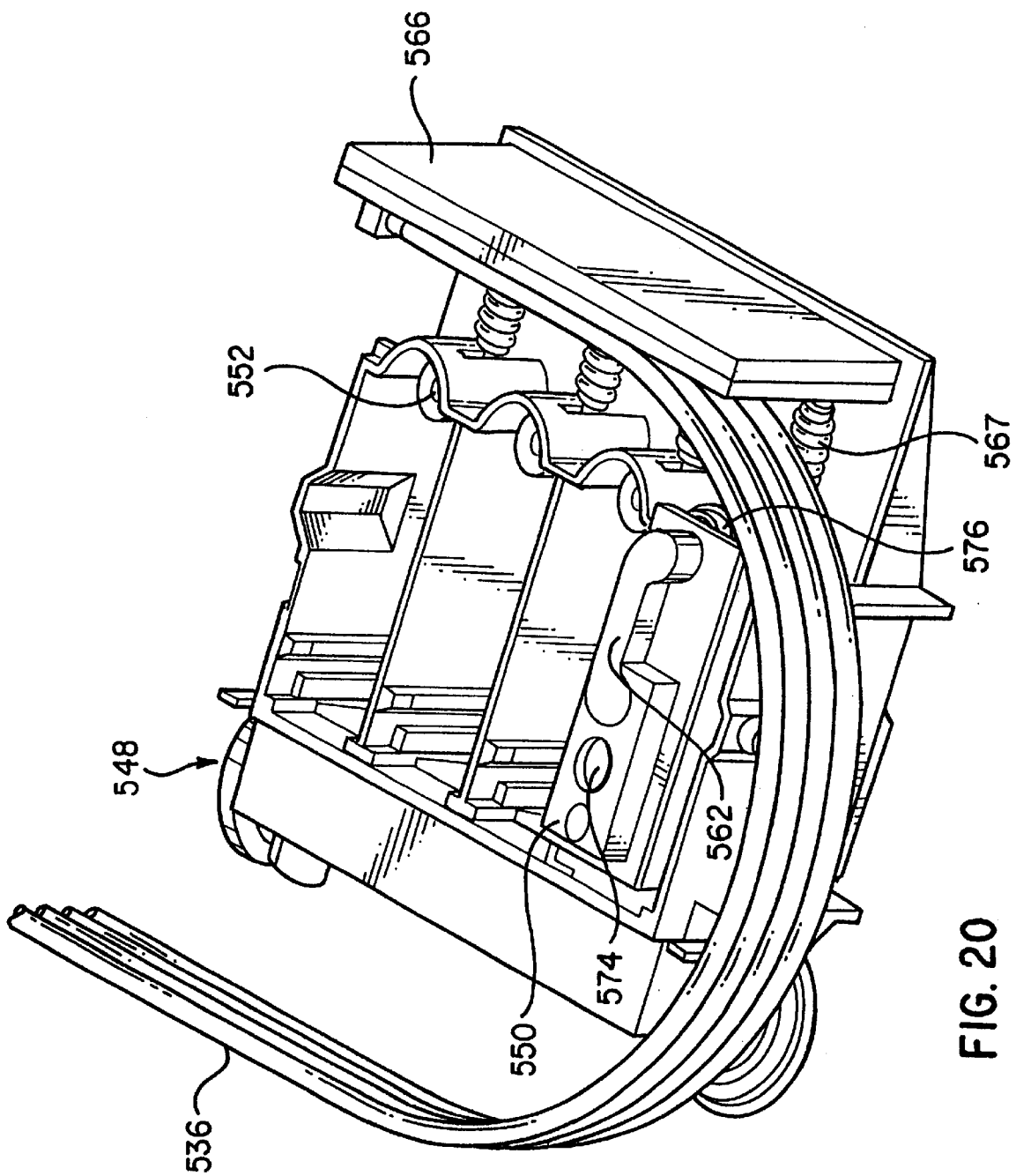
FIG. 20 is a top perspective view of the carriage of FIG. 19.

FIG. 20 is a perspective view of carriage 548 looking down on carriage 548 and showing one print cartridge 550 installed.

If desired, the print cartridges can be secured within the scanning carriage by individual latches, which may be manually operated or spring loaded, where the latches press down on a tab or a corner of the print cartridge. In the presently preferred embodiment, a single latch, such as a hinged bar, secures all four print cartridges in place within the carriage.

Figure 21:
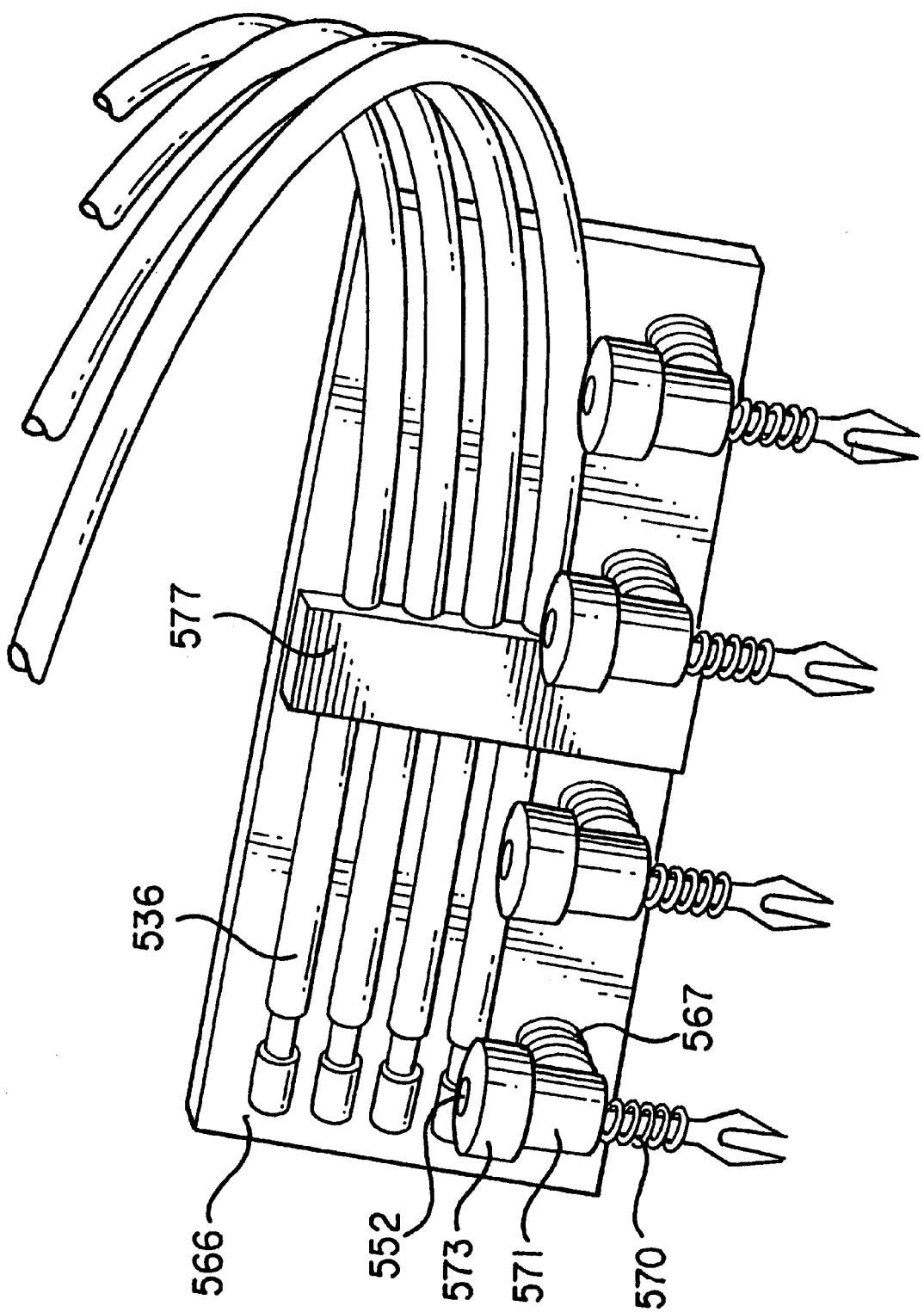
FIG. 21 shows the details of the ink replenishment valve system for the carriage.

FIG. 21 is a detailed view of manifold 566, tubes 536, crimp cap 573, septum 552, septum elbow 571, spring 570, and bellows 567 descried with respect to FIG. 19. A stress reliever 577 for tubes 536 is also shown.

Figure 22:
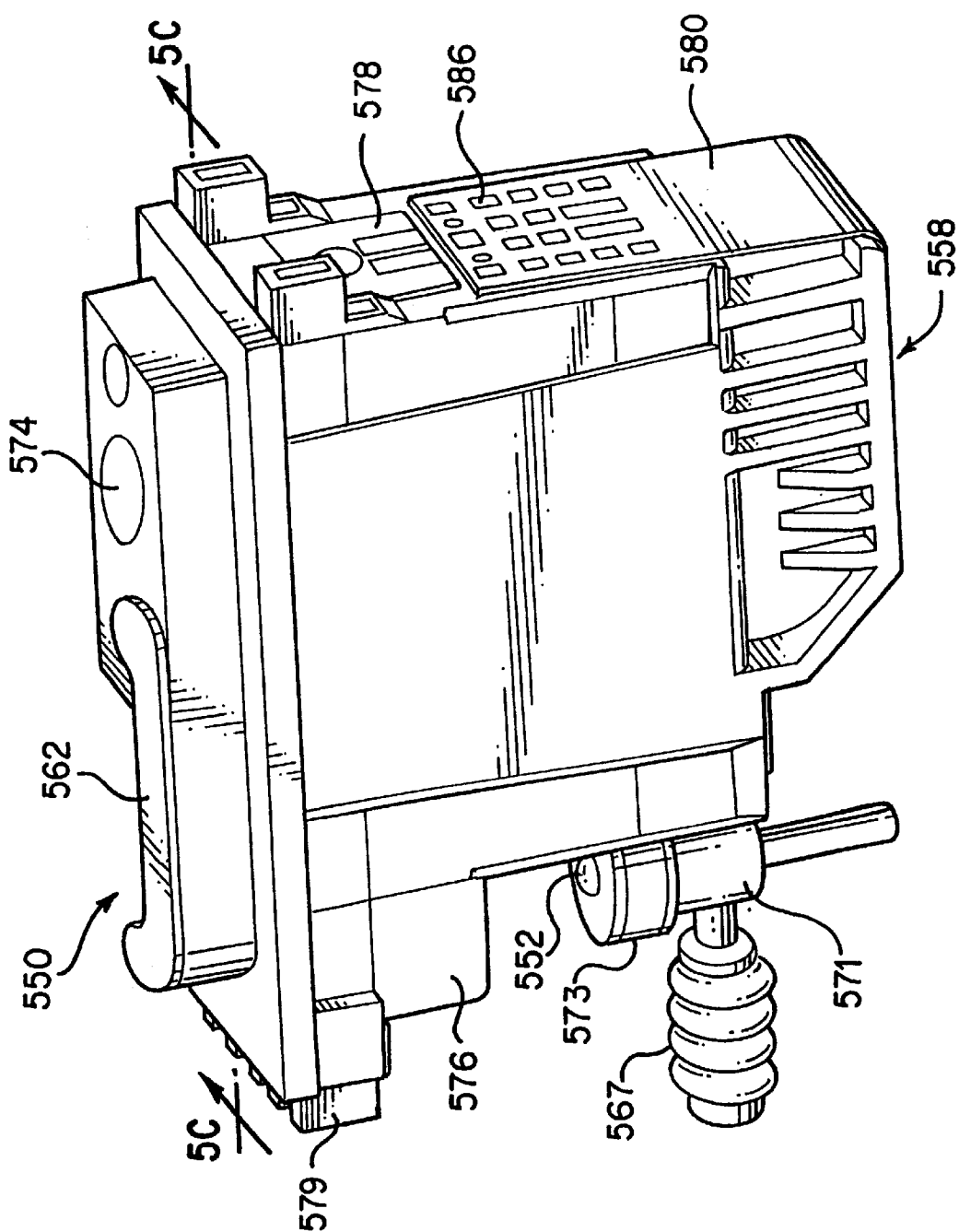
FIG. 22 is a perspective view of one type of print cartridge with its ink replenishment valve.
Figure 23:
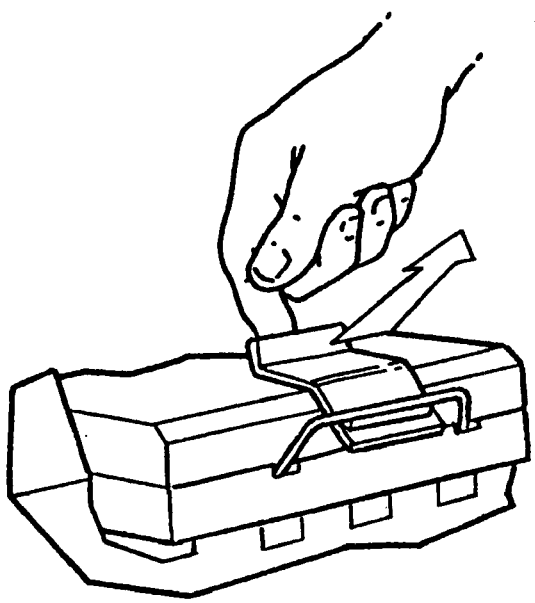
FIG. 23 shows the manner of initially unlatching a cover on the carriage for the wide format inkjet printer of FIG. 13.
Figure 24:
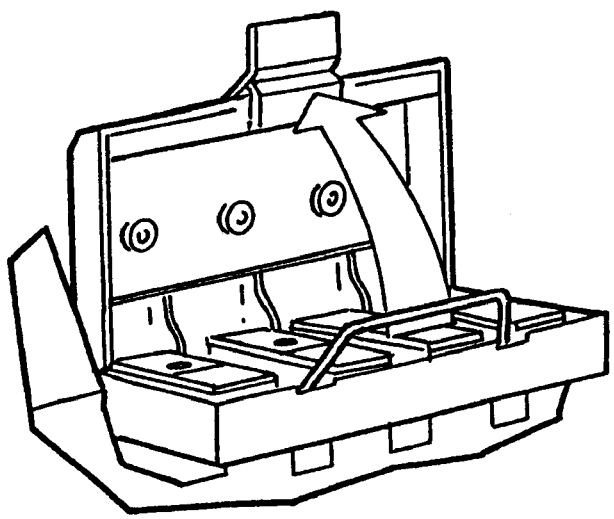
FIG. 24 shows the cover in open position allowing access to the printheads.
Figure 25:
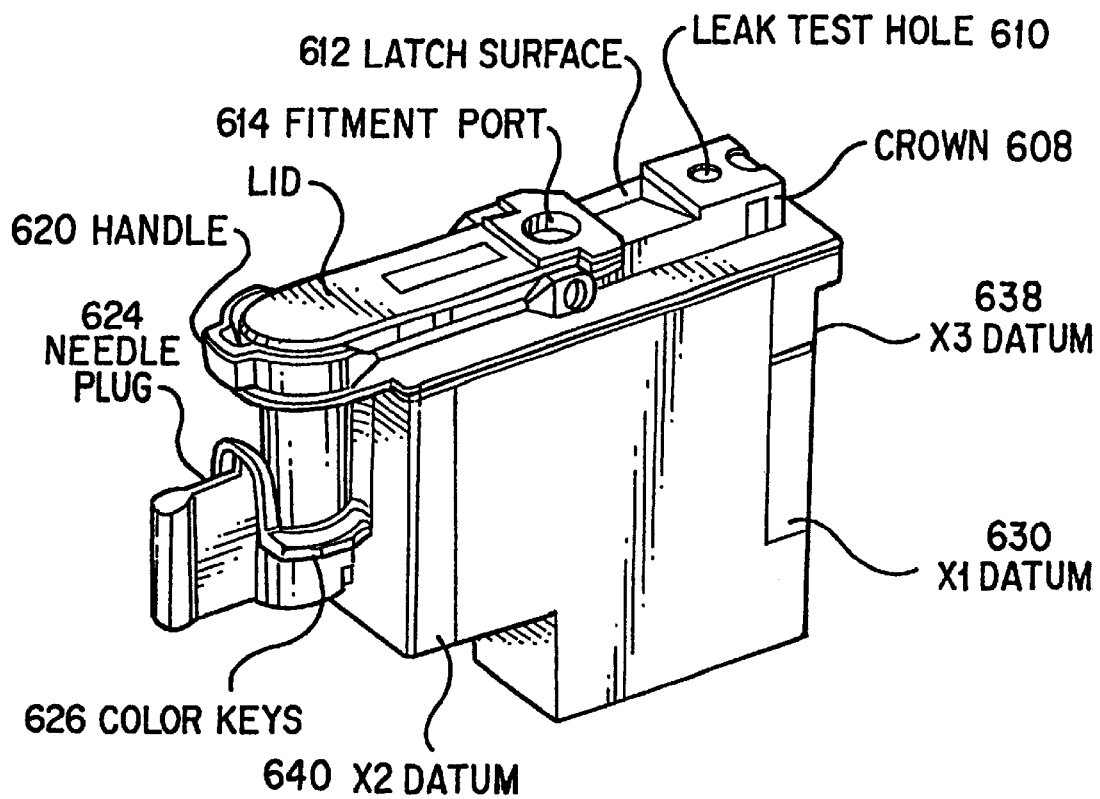
FIG. 25 is a top perspective view of a recent print cartridge embodiment showing the crown with the print cartridge handle down, and with a removable plug over the needle inlet.
Figure 26:
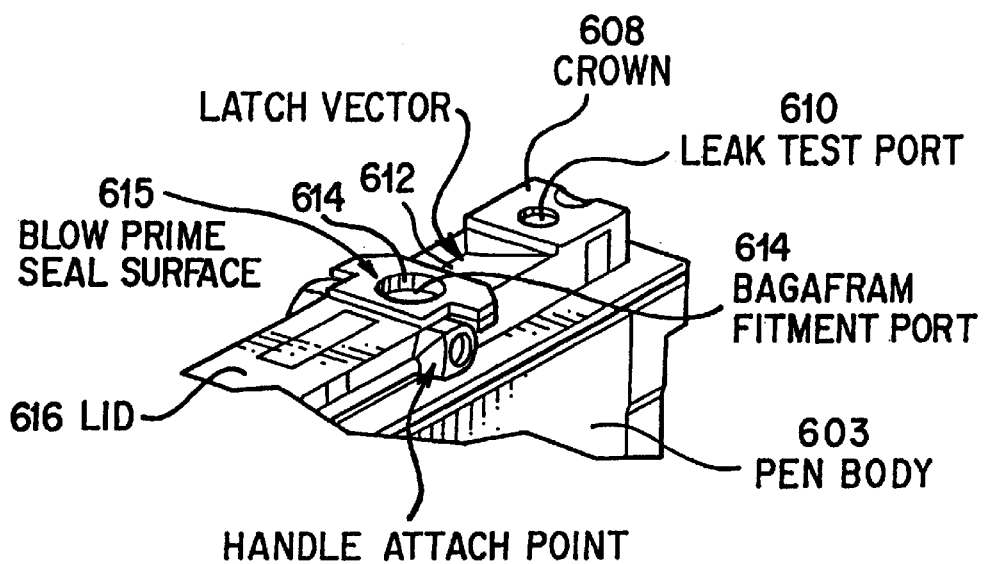
FIG. 26 shows a portion of the crown with the print cartridge handle removed.
Figure 27:
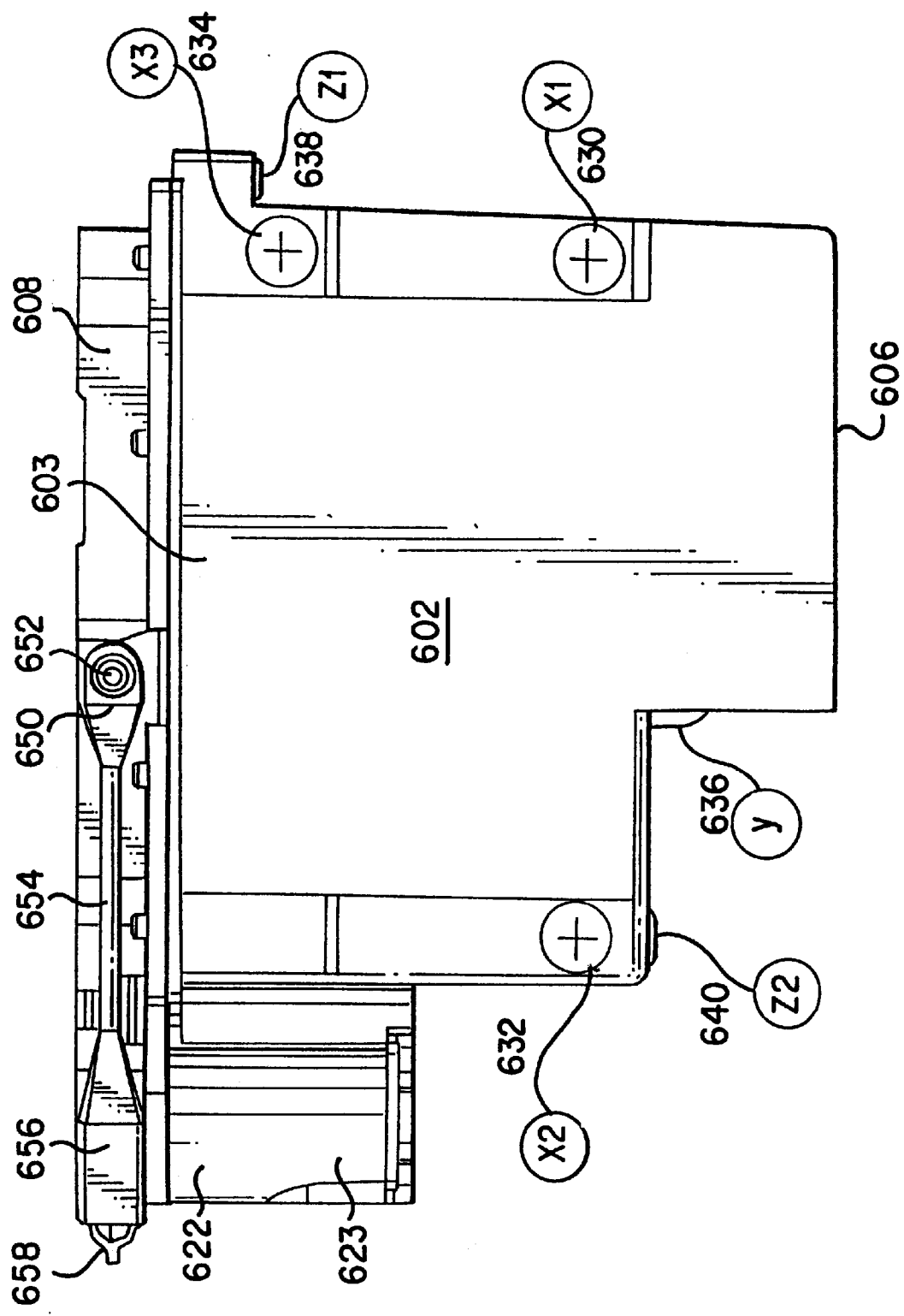
FIG. 27 is a side elevational view of the print cartridge with its handle down, and showing some of the datums.
Figure 28:
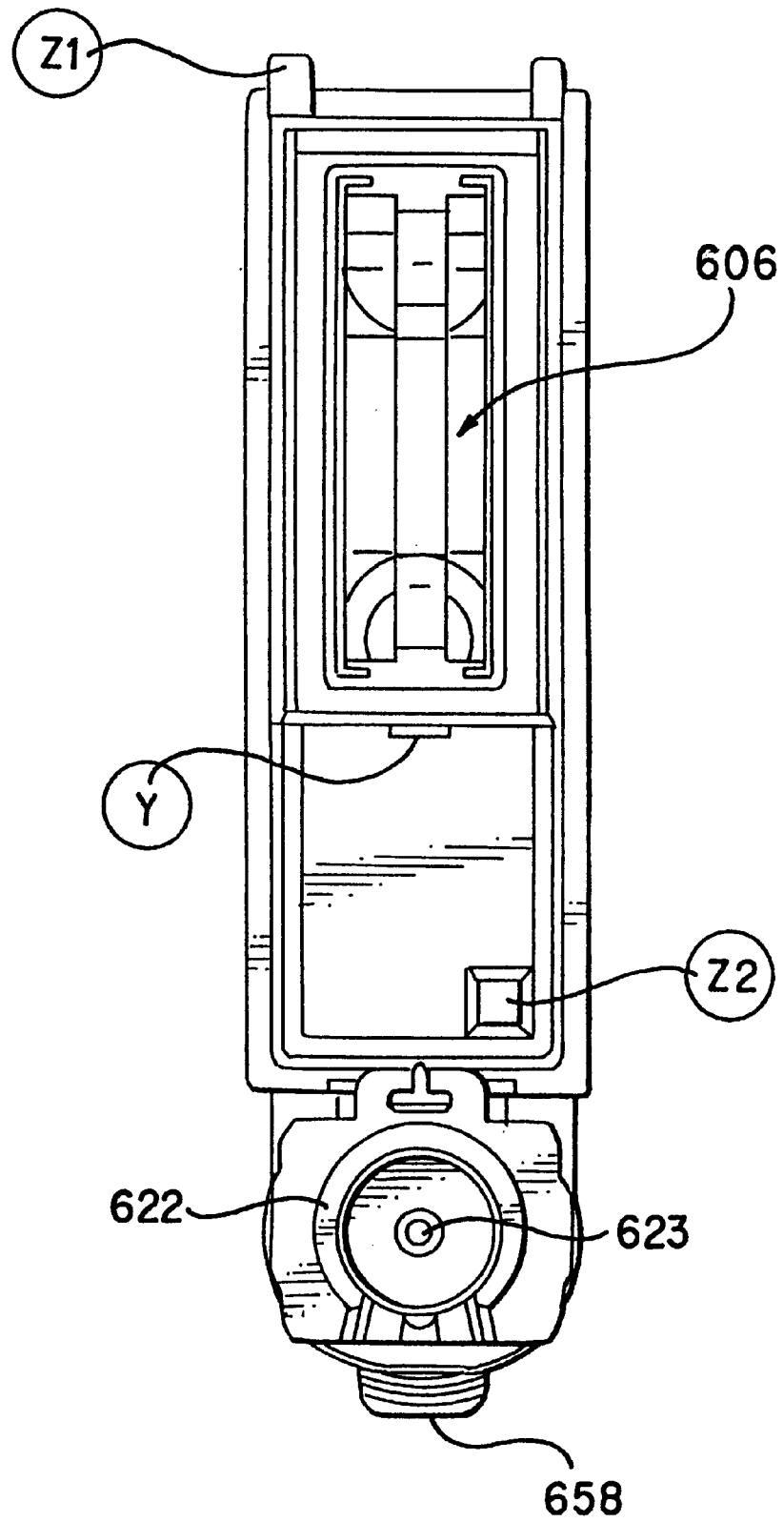
FIG. 28 is a bottom plan view of the print cartridge without its printhead and showing some of its datums.

FIG. 22 is a perspective view of a presently preferred embodiment of print cartridge 550. A shroud 576 (also shown in FIG. 20) surrounds needle 560 (obscured by shroud 576) to prevent inadvertent contact with needle 560 and also to help align septum 552 with needle 560 when installing print cartridge 550 in carriage 548.

A flexible tape 580 containing contact pads 586 leading to the printhead substrate is secured to print cartridge 550. These contact pads 586 align with and electrically contact electrodes 549 (FIG. 19) on carriage 548. Preferably, the electrodes on carriage 548 are resiliently biased toward print cartridge 550 to ensure a reliable contact.

The recent embodiment of the unique compact print cartridge in its presently preferred embodiment is employed in a large format rollfeed/sheet feed printer. While some of the features are closely similar to the earlier embodiment shown in FIGS. 3–4 and other related FIGS., new reference numerals will be used for clarification. In that regard, the print cartridge 602 includes a body 603 which forms an internal reservoir and a lower snout 604 which extends more than half the distance across a lower end of the internal reservoir and defines a nozzle area 606 from which ink is applied to media. An upper crown 608 includes on one end (generally above the snout) a leak test hole 610, a slanted vector force contact area 612, and a vent hole 614 to the valve-actuator bellows surrounded by a primer seal area 615. The other end of the crown includes a lid 616 which covers an enclosed passage connecting the fluid interconnect 618 with an inlet valve to the internal reservoir, and a peripheral ledge 619 which provides a recess for receiving a handle 620 in its down position. The fluid interconnect includes a shroud 622 surrounding a downwardly projecting needle 623 which is protected by a plug 624 during shipment and before installation in the carriage. A color keying component 626 is used to assure that each print cartridge is installed in its proper chute or slot in the carriage.

The datums on the print cartridge include three X datums 630, 632, 634, one Y datum 636 and two Z datums 638, 640 as shown in the Figs which are arranged to assure proper and secure positioning against matching datums surfaces in the carriage. In contrast to some earlier print cartridges, these datums need not be machined in order to avoid misalignment.

The handle 620 includes enlarged hubs 650 which are pivotally mounted on pins 652. The hubs are at each end of two small diameter legs 654 which join together to form a thickened loop 656 having an outwardly extending tab 658.

It will be understood from the foregoing description and accompanying drawings that the print cartridge of the present invention provides a set of unique mechanical interface features that enable high performance printheads (sometimes referred to herein as "pens") designed to receive ink from separable external ink supplies while maintain a compact printer form factor. This feature set includes a novel combination of outside form factor, datum arrangement, latching, and handle which have been matched with corresponding features in the carriage to facilitate print cartridge installation, printing, servicing, removal and replacement while maintaining predictable and precise tolerances around the required fluid and electrical interconnections.

The lower height dimension serves to minimize the overall printer height, and allows a printer to be stored and/or used in typical nineteen inch rack mountable hardware. The minimal width serves to diminish the eight-times multiplier effect caused by a four printhead carriage overtravel on each end of the carriage scan. Depth has the least impact on the product size, and in fact the additional depth helps to provides better theta-z rotational control of the print cartridges mounted in the carriage.

Weight is important to minimize motor force requirements which has a direct impact on product cost. Also, printers using heavier print cartridges often generate objectionable shaking and vibrations when used on a high performance carriage which has an increased range of acceleration/deceleration at both ends of the scan.

The following table shows the changes for the new 600 dpi printhead of the present invention as compared to a typical previous 600 dpi printhead of Hewlett-Packard:

TABLE I

|  | # of Nozzles | Height | Width | Depth | Weight with ink |
| --- | --- | --- | --- | --- | --- |
| Old Spring-Bag | 300 | 93 mm | 18.7 mm | 60 mm | 113 gms |
| New Compact Size | 512 | 51 | 15.9 | 70 | 38 gms |

The improved datum arrangement has been developed in order to successfully implement the small form factor and to assure precise positioning during the life of a semi-permanent print cartridge and printhead. In this regard, the datum arrangement minimizes undesirable theta-z variations. Also, the datum locations are spaced apart as much as possible from the printhead itself to minimize any adverse effect of datum engagement generated particles on successful ink ejection from the printhead.

The position of the latch force vector minimizes alignment variation for a small form factor print cartridge. The latch applies a force of the top of the print cartridge that passes between the fluid and electrical connections to the printhead. The fluid and electrical connections are made at opposing ends of the print cartridge. The latch force vector is applied at a point between these connections, and in a preferred embodiment is applied at a point that is proximate to the intersection of a plane that bisects the nozzle plane and passes through the top of the print cartridge. The exact predetermined location for applying the latch force minimizes the overall force required to accurately position this small form factor print cartridge. Moreover, if there is a printhead/media crash that knocks the print cartridge out of alignment, the latch mechanism in combination with the datums will tend to correctly reseat the print cartridge in that carriage.

While particular exemplary embodiments have been shown and described, it will be appreciated by those skilled in the art that various changes, substitutions and improvements can be made without departing from the spirit and scope of the invention as set forth in the following claims.

We claim as our invention:

1. An inkjet printing system comprising:

a printer frame;

a carriage on said frame;

a platen located under said carriage to define a print zone for holding media;

at least one print cartridge removably mounted on said carriage and having an electrical interconnect for receiving control signals and a fluid interconnect for receiving printing fluid from an external supply; and a latching device on said carriage and movable between an open position allowing said at least one print cartridge to be installed on said carriage or to be removed from said carriage, and a closed position preventing manual interference with said at least one print cartridge during a printing operation as well as securely holding said electrical interconnect and said fluid interconnect in their respective predetermined positions.

2. The printing system of claim 1 which includes a plurality of print cartridges, and wherein said latching device is sized and shaped in order to collectively prevent manual interference with said plurality of print cartridges as well as to collectively provide said holding of said electrical interconnect and said fluid interconnect when said latching device is in said closed position.

3. The printing system of claim 2 wherein said latching device includes a unitary member which moves between said open position and said close position.

4. The printing system of claim 1 wherein said latching device includes a priming passage, and wherein said closed position securely holds said priming passage in a certain aligned position to allow priming of said at least one print cartridge.

5. The printing system of claim 2 wherein said latching device includes a plurality of priming passages respectively associated with each of said plurality of print cartridges, and wherein said closed position securely holds said priming passages in certain aligned positions to allow selective priming of said plurality of print cartridges.

6. The printing system of claim 5 which further includes a primer actuation member located on said printer frame and capable of interconnection with said priming passages.

7. The printing system of claim 6 wherein said primer actuation member is a pump.

8. The printing system of claim 4 wherein said at least one print cartridge includes a vent, and said certain aligned position allows said priming passage to be in communication with said vent.

9. The printing system of claim 1 wherein said at least one print cartridge includes positional datums, and wherein said carriage includes matching carriage datums, and wherein said latching device includes a contact member which is biased to provide a force against said at least one print cartridge to securely hold said positional datums against said matching carriage datums.

10. The printing system of claim 9 wherein said contact member is spring loaded in order to provide said biased force.

11. The printing system of claim 1 wherein said latching device includes a contact member which engages a portion of said at least one print cartridge to provide a force component holding said fluid interconnect in its respective predetermined position.

12. The printing system of claim 1 wherein said latching device includes a contact member which engages a portion of sad at least one print cartridge to provide a force component holding said electrical interconnect in its respective predetermined position.

13. The printing system of claim 4 wherein said latching device includes a contact member which engages a portion of said at least one print cartridge to provide a force component holding said priming passage in said certain aligned position.

14. The inkjet printing system of claim 1 which includes a color liquid in said external supply, and a container on said frame for holding said external supply.

15. The inkjet printing system of claim 2 which includes a plurality of external supplies, and a plurality of different color liquids in said external supplies, respectively.

16. An inkjet printing system comprising:

a printer frame;

a carriage on said frame and having multiple circuit pads and an ink supply conduit;

a platen located under said carriage to define a print zone for holding media;

a support member on said frame for slidably mounting said carriage for movement from said print zone to a service zone;

a plurality of print cartridges removably mounted on said carriage and each having an electrical interconnect and a fluid replenishment interconnect; and a latching device movable by manual manipulation between an open position and a closed position, said open position allowing removal and installation of said print cartridges in said carriage, and said closed position providing secure positioning of said print cartridges in said carriage to hold said electrical interconnect in conductive engagement with said multiple circuit pads and to hold said replenishment interconnect in fluidic communication with said ink supply conduit.

17. The printing system of claim 16 wherein said latching device remains in said close position when said carriage moves to said service zone, and wherein said print cartridges each include a priming inlet which is engageable with a priming actuator when said carriage is in said service zone and when said latching device is in a closed position.

18. The printing system of claim 16 wherein said latching device includes a unitary member collectively preventing user interference with said print cartridges when said latching device is in said closed position.

19. The printing system of claim 16 wherein said latching device includes a unitary member collectively allowing user installation or replacement of any one of said print cartridges when said latching device is in said open position.

20. A method of inkjet printing comprising:

providing one or more printheads with an ink reservoir and a replenishment valve for said reservoir;

providing an electrical interconnect on each of the printheads;

providing a carriage with an ink supply connection and a control signal interface;

removably mounting each of said printheads on said carriage with said electrical interconnect in conductive engagement with said sign interface and with said replenishment valve in fluidic engagement with said ink supply connection; and moving a latch device from an open position allowing installation and removal of any one of the printheads from the carriage to a closed position holding the electrical interconnect in said conductive engagement and holding said replenishment valve in said fluidic engagement;

providing liquid ink for the ink supply connection; and passing the liquid ink through said replenishment valve into the ink reservoir during a printing operation while the latch device is in the closed position.

* * * * *

UNITED STATES PATENT AND TRADEMARK OFFICE
CERTIFICATE OF CORRECTION

PATENT NO.    : 6,367,918 B1
DATED         : April 9, 2002
INVENTOR(S)   : Heiles et al.

It is certified that error appears in the above-identified patent and that said Letters Patent is hereby corrected as shown below:

<u>Column 13,</u>
Line 3, delete "sad" and insert in lieu thereof -- said --.

Signed and Sealed this

Eighth Day of October, 2002

*Attest:*

*Attesting Officer*

JAMES E. ROGAN
*Director of the United States Patent and Trademark Office*